(12) United States Patent
Igarashi

(10) Patent No.: US 7,248,391 B2
(45) Date of Patent: Jul. 24, 2007

(54) OPTICAL SCANNING SYSTEM AND IMAGE FORMING APPARATUS USING THE SAME

(75) Inventor: Jun Igarashi, Imaichi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/606,875

(22) Filed: Dec. 1, 2006

(65) Prior Publication Data

US 2007/0127105 A1     Jun. 7, 2007

(30) Foreign Application Priority Data

Dec. 6, 2005     (JP)     ............... 2005-352347

(51) Int. Cl.
*G02B 26/08*     (2006.01)
*B41J 27/00*     (2006.01)

(52) U.S. Cl. ............... 359/205; 359/206; 359/207; 359/216; 347/259

(58) Field of Classification Search ............... None
See application file for complete search history.

(56) References Cited

U.S. PATENT DOCUMENTS

| | | | |
|---|---|---|---|
| 4,352,541 A | 10/1982 | Minoura et al. | ............ 359/206 |
| 5,111,219 A | 5/1992 | Makino | ............ 347/259 |
| 5,883,732 A | 3/1999 | Takada et al. | ............ 359/207 |
| 6,094,286 A * | 7/2000 | Kato | ............ 359/206 |
| 6,141,133 A | 10/2000 | Suzuki et al. | ............ 359/207 |
| 6,774,924 B2 * | 8/2004 | Kato et al. | ............ 347/244 |

FOREIGN PATENT DOCUMENTS

| | | |
|---|---|---|
| JP | 54-87540 | 7/1979 |
| JP | 1-302217 | 12/1989 |
| JP | 4-50908 | 2/1992 |
| JP | 9-33850 | 2/1997 |

* cited by examiner

*Primary Examiner*—James Phan
(74) *Attorney, Agent, or Firm*—Fitzpatrick, Cella, Harper & Scinto

(57) ABSTRACT

Disclosed is an optical scanning system and an image forming apparatus having the same, wherein, in one preferred form of the invention, the optical scanning system includes a light source device, a deflecting device for scanningly deflecting a light beam from the light source device, and an imaging optical system for imaging, upon a scan surface to be scanned, the light beam deflected by the deflecting device, wherein the imaging optical system consists of a single imaging optical element with a light exit surface having a concave shape with respect to a main-scan sectional plane, and wherein relations $$0.5 \leq \phi m/\phi p \leq 0.9$$

$$0 < dp/kp \leq 0.09$$

are satisfied where $\phi p$ is a power of the imaging optical element at an optical axis with respect to the main-scan direction, $\phi m$ is a power of the imaging optical element at an outermost abaxial portion with respect to the main-scan direction, $dp$ is a thickness of the imaging optical element at the optical axis, and $kp$ is a k-θ coefficient of the imaging optical element at the optical axis.

19 Claims, 12 Drawing Sheets

OPTICAL SCANNING SYSTEM AND IMAGE FORMING APPARATUS USING THE SAME

FIELD OF THE INVENTION AND RELATED ART

This invention relates to an optical scanning system and an image forming apparatus using the same. The present invention is suitably applicable to an image forming apparatus such as a laser bean printer, a digital copying machine or a multiple-function printer, having an electrophotographic process, for example.

In optical scanning systems of laser beam printers, for example, a light beam is optically modulated and emitted from a light source in accordance with an imagewise signal, and it is then periodically deflected by means of an optical deflector having a rotary polygonal mirror, for example. The thus deflected light beam is focused into a light spot upon the surface of a photosensitive recording medium (photosensitive drum) by means of an imaging optical system having a k-θ characteristic, to be described later, by which the drum surface is optically scanned and image recording is carried out thereby.

FIG. 16 is a schematic view of a main portion of such optical scanning system.

In FIG. 16, a divergent light beam emitted from a light source means 161 is transformed into a parallel light beam by a collimator lens 162 and, after it is restricted by a stop 163, the light beam enters into a cylindrical lens 164 having a predetermined refractive power only in a sub-scan direction. As far as a main-scan sectional plane is concerned, the parallel light incident on the cylindrical lens 164 exits therefrom while keeping its state. As far as a sub-scan sectional plane concerns, the light beam is converged and imaged as a linear image upon a deflecting surface (reflection surface) 165a of a deflecting means 165 that comprises a rotary polygonal mirror.

The light beam deflected by the deflecting surface 165a of the deflecting means 165 is directed onto a photosensitive drum surface 168 as a scan surface to be scanned, by an imaging optical system 166 having a k-θ characteristic. By rotating the deflecting means 165 in a direction of an arrow A, the photosensitive drum surface 168 is optically scanned in a direction of an arrow B, whereby imagewise data is recorded thereon.

In such optical scanning systems, for high-precision recording of imagewise data, it is required that the field curvature is well corrected throughout the scan surface and that the spot diameter on the image plane is even at different image heights. Various proposals have been made to provide optical scanning systems satisfying such optical characteristics or having correction optical systems (imaging optical elements) to achieve them.

On the other hand, in image forming apparatuses such as laser beam printers or digital copying machines, compactness and simplicity of the whole structure are strongly desired and, likewise, it is also with the case of optical scanning systems.

Some proposals have been made in regard to optical scanning systems in an attempt to satisfying such requirement, wherein an imaging optical system is constituted by a single imaging optical element (imaging lens) (see Patent Documents Nos. 1, 2, 3 and 4).

In Patent Document No. 1, the imaging lens is made of a material having relatively high refractive index of 1.8, by which satisfactory imaging performance is assured despite that the imaging lens has thin thickness.

In Patent Document No. 2, although the optical scanning lens uses a single imaging lens element, large deflection-angle scan is accomplished and, additionally, the curvature field in the main-scan direction and sub-scan direction is corrected effectively.

In Patent Document No. 3, a higher-order aspherical surface is used in the main-scan-direction lens surface of the imaging lens, by which aberration characteristic is well corrected.

In Patent Document No. 4, at least two of plural lens surfaces of an imaging lens are formed with a curvature in the sub-scan direction that changes continuously along the main-scan direction, within the effective portion of the imaging lens and independently of the curvature in the main-scan direction. With this arrangement, the position of the principal plane in the sub-scan direction is controlled on the basis of the bending of the two surfaces and the sub-scan magnification is kept constant for different image heights, whereby the spot diameter is maintained constant.

[Patent Documents]
1. Japanese Laid-Open Patent Application, Publication No. S54-87540
2. Japanese Laid-Open Patent Application, Publication No. H1-302217
3. Japanese Laid-Open Patent Application, Publication No. H4-50908
4. Japanese Laid-Open Patent Application, Publication No. H9-33850

SUMMARY OF THE INVENTION

In Patent Document No. 1, however, using a lens material having high refractive index such as glass material is very inconvenient in respect to manufacture because the cost would be increased thereby.

In Patent Document No. 2, since the imaging lens has to have a large thickness, lens molding would be difficult to do.

In Patent Document No. 3, the imaging magnification (sub-scan magnification) in the sub-scan sectional plane between the optical deflector and the scan surface is uneven. This means a possibility that the spot diameter in the sub-scan direction will change with the image height.

In Patent Document No. 4, at least two lens surfaces are bent to control the principal plane position to provide a constant magnification, so as to maintain the sub-scan magnification constant. This means that the surface shape in the main-scan sectional plane and the surface shape in the sub-scan sectional plane must be controlled completely independently of each other. To this end and in order to reduce the lens thickness, the lens shape in the main-scan direction should have a large aspherical amount. However, if a lens having large aspherical amount in the main-scan direction is used, the optical performance can be deteriorated largely by a small error of lens surfaces or by a lens setting error. Particularly, in such optical performance degradation, the scan-line curvature in the sub-scan direction directly causes deviation in scan-line height as well as scan-line tilt, for example, and seriously these couldn't be corrected through adjustment of a mirror or the like provided inside the system. In order to minimize such scan-line curvature, the lenses and lens surfaces must be set precisely exactly in accordance with the design or, alternatively, a lens adjusting mechanism has to be added to adjust the same to assure the design setting.

In color image forming apparatuses, on the other hand, a color image is produced by superposing images of four colors of Y (yellow), M (magenta), C (cyan) and Bk (black), formed on the surfaces of four photosensitive members (photosensitive drums), on a transfer material such as paper sheet. Therefore, if the scan line of optical scanning systems corresponding to these photosensitive members, respectively, has a curvature, it causes an error in the scan-line shape among the four colors, resulting in color misregistration in the image produced on the transfer material. Thus, the image quality would be degraded considerably.

It is accordingly an object of the present invention to provide an optical scanning system and an image forming apparatus by which the thickness of a single imaging optical element, constituting an imaging optical system, can be reduced and good imaging performance is accomplished with a simple structure.

In accordance with an aspect of the present invention to achieve the above object, there is provided an optical scanning system, comprising: light source means; deflecting means for scanningly deflecting a light beam from said light source means; and an imaging optical system for imaging, upon a scan surface to be scanned, the light beam deflected by said deflecting means, wherein said imaging optical system consists of a single imaging optical element with a light exit surface having a convex shape with respect to a main-scan sectional plane, and wherein relations $$0.5 \leq \phi m/\phi p \leq 0.9$$

$$0 < dp/kp \leq 0.09$$

are satisfied, where $\phi p$ is a power of said imaging optical element at an optical axis with respect to a main-scan direction, $\phi m$ is a power of said imaging optical element at an outermost abaxial portion with respect to the main-scan direction, dp is a thickness of said imaging optical element at the optical axis, and kp is a k-θ coefficient of said imaging optical element at the optical axis.

In one preferred form of this aspect of the present invention, a relation $$1.1 \leq Vm/Vp \leq 1.5$$

is satisfied where Vp is a scan speed on the scan surface at the optical axis, and Vm is a scan speed at an outermost abaxial portion.

The deflecting means may scanningly deflect the light beam from said light source means at a constant angular speed, and a relation $$0.1 \leq V \leq 0.5$$

may be satisfied where V is a third-order (tertiary) distortion aberration coefficient of said single imaging optical element.

A relation $N \leq 1.6$ may be satisfied where N is a refractive index of said single imaging optical element.

A relation $30° \leq \theta max < 90°$ may be satisfied where θmax is a largest deflection angle of said deflecting means for scan inside an effective scan width on the scan surface.

A relation $|\beta s| \leq 3.0$ may be satisfied where βs is an imaging magnification of said single imaging optical element at the optical axis with respect to the sub-scan sectional plane.

The light beam incident on said single imaging optical element may be a convergent light with respect to the main-scan sectional plane.

The single imaging optical element may have a light entrance surface having a non-arcuate shape with respect to the main-scan sectional plane.

The single imaging optical element may have a light entrance surface and a light exit surface having a convex shape with respect to the main-scan sectional plane.

The single imaging optical element may have a light entrance surface and a light exit surface, at least one of which has a power with respect to the sub-scan direction that is decreasing along the main-scan direction from the optical axis toward an abaxial portion.

The single imaging optical element may have a light entrance surface and a light exit surface, at least one of which has a non-arcuate shape with respect to the sub-scan sectional plane.

The imaging magnification of said single imaging optical element at the optical axis with respect to the sub-scan sectional plane and an imaging magnification of the same at an outermost abaxial portion may have a difference of 10% or less.

The imaging magnification of said single imaging optical element at the optical axis with respect to the sub-scan sectional plane and an imaging magnification of the same at an outermost abaxial portion have a difference of 5% or less.

With respect to the sub-scan sectional plane, the light beam from said light source means may be projected on said deflecting means in an oblique direction relative to a normal to the deflecting surface of said deflecting means.

The light source means may comprise a plurality of light emitting portions which are arranged to be modulated independently of each other.

In accordance with another aspect of the present invention, there is provided an image forming apparatus, comprising: an optical scanning system as recited above; a photosensitive material disposed at a scan surface to be scanned; a developing device for developing an electrostatic latent image formed on said photosensitive material through a light beam scanned by said optical scanning system, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning system as recited above; and a printer controller for converting code data supplied from an outside machine into an imagewise signal and for inputting the imagewise signal into said optical scanning system.

In accordance with a yet further aspect of the present invention, there is provided a color image forming apparatus, comprising: an optical scanning system as recited above; and a plurality of image bearing members each being disposed at a scan surface to be scanned by said optical scanning system, for forming images of different colors.

In one preferred form of this aspect of the present invention, the color image forming apparatus further comprises a printer controller for converting a color signal supplied from an outside machine into imagewise data of different colors and for inputting the imagewise data into corresponding optical scanning systems.

Briefly, in accordance with the present invention, there is provided an optical scanning system or an image forming apparatus having the same, wherein the thickness of a single imaging optical element can be reduced, and san line curvature due to any eccentricity of the optical surface of the imaging optical element can be reduced with a very simple structure, such that undesirable spot rotation can be compensated for satisfactorily.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
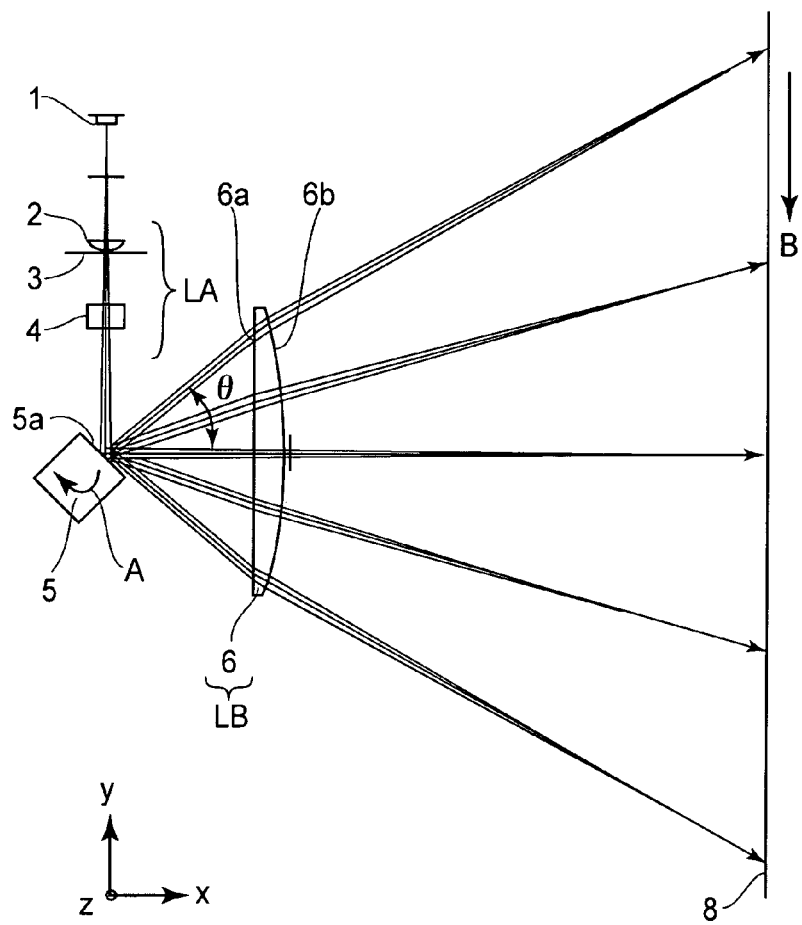
FIG. 1 is a schematic view, along a main-scan sectional plane, of an optical scanning system according to a first embodiment of the present invention.
Figure 2:
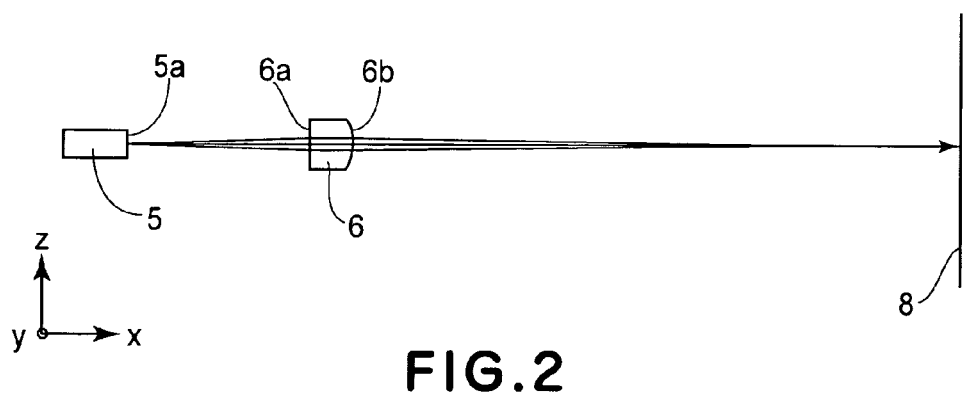
FIG. 2 is a schematic view, along a sub-scan sectional plane, of the optical scanning system according to the first embodiment of the present invention.

FIG. 1 is a sectional view along a main-scan direction (main-scan sectional plane) of a main portion of an optical scanning system according to a first embodiment of the present invention. FIG. 2 is a schematic view along a sub-scan direction (sub-scan sectional plane) of the main portion of the optical scanning system according to the first embodiment of the present invention.

In this specification, the term "main-scan direction" refers to a direction which is perpendicular to the rotational axis of a rotary polygonal mirror and to the optical axis of an imaging optical system (that is, a direction in which a light beam is reflectively deflected (deflectively scanned) by the rotary polygonal mirror). The term "sub-scan direction" refers to a direction which is parallel to the rotational axis of the rotary polygonal mirror. The term "main-scan sectional plane" refers to a plane that contains the main-scan direction and the optical axis of the imaging optical system. The term "sub-scan sectional plane" refers to a plane which is perpendicular to the main-scan sectional plane.

In FIGS. 1 and 2, denoted at 1 is light source means which may comprise a semiconductor laser, for example. The light source means 1 may have a single light emitting portions or a plurality of light emitting portions.

Denoted at 2 is a condensing lens (anamorphic lens) as a collecting optical system, and it functions to transform a divergent light beam emitted from the light source means 1 into a convergent light beam. Denoted at 3 is an aperture stop having a function for restricting the light beam passing therethrough to thereby shape the beam configuration. Denoted at 4 is a lens system (cylindrical lens) having a predetermined power only in the sub-scan sectional plane (sub-scan direction). It functions to focus the light beam, passing through the condensing lens 2, with respect to the sub-scan sectional plane and upon a deflecting surface 5a of an optical deflector 5, to be described later, as a linear image (linear image extending in the main-scan direction). The function of the condensing lens 2 and the cylindrical lens 4 described above may be provided by one and the same optical element. The above-described elements such as condensing lens 2, aperture stop 3 and cylindrical lens 4 are components of an input optical system LA.

Denoted at 5 is an optical deflector as deflecting means. It may comprise a polygonal mirror (rotary polygon) having four deflecting surfaces, for example. The polygonal mirror 5 can be rotated by driving means such as a motor (not shown) in a direction of an arrow A in the drawing and at a predetermined speed (constant angular speed).

Denoted at LB is an imaging optical system having a light collecting function and k-θ characteristic. It consists of a single imaging lens (which may be called a scanning lens or a k-θ lens) 6 having different powers with respect to the main-scan direction (main-scan sectional plane) and the sub-scan direction (sub-scan sectional plane), respectively, and having a light exit surface being convexed toward the scan surface.

The imaging lens 6 functions to image the light beam, reflectively deflected by the optical deflector 5 and based on imagewise information, as a light spot upon the surface of a photosensitive drum (scan surface to be scanned) 8. The imaging lens has an additional function of providing an optically conjugate relationship, with respect to the sub-scan sectional plane, between the deflecting surface 5a of the optical deflector 5 and the photosensitive drum surface 8, to thereby compensate any surface tilt of the deflecting surface.

The imaging lens 6 of this embodiment comprises a plastic lens produced through a molding process and having a refractive index of 1.5. Since in this embodiment a glass material having a difficulty in production is not used as the imaging lens 6, a higher productivity is attainable. Furthermore, the production is easier. However, in this embodiment, any mold lens such as a glass mold lens may be used.

Denoted at 8 is the photosensitive drum surface as the scan surface to be scanned. Denoted at θ is the deflection angle (scan angle) of the optical deflector 5 for the scan within the effective scan width upon the scan surface.

In this embodiment, a divergent light beam from the semiconductor laser 1 is transformed into a convergent light beams by means of the condensing lens 2, and then, by means of the aperture stop 3, the light beam (light quantity thereof) is restricted. The light beam then enters the cylindrical lens 4. As far as the main-scan sectional plane is concerned, the light beam incident on the cylindrical lens 4 exits therefrom while keeping its state unchanged. As far as the sub-scan sectional plane concerns, the light beam is further converged, and it is focused upon the deflecting surface 5a of the optical deflector 5 as a linear image (linear image extending in the main-scan direction). The light beam is then deflected by the deflecting surface 5a of the optical deflector 5, and the deflected light beam is subsequently imaged into a light spot upon the photosensitive drum surface 8 by means of the imaging lens 6. Thus, by rotating the optical deflector 5 in the direction of an arrow A, the photosensitive drum surface 8 is optically scanned in the direction of an arrow B (main-scan direction), whereby an image is recorded on the photosensitive drum (recording medium).

In this embodiment, with respect to the main-scan sectional plane, the convergent light beam transformed by the condensing lens 2 is incident on the imaging lens 6 through the optical deflector 5. Thus, with this arrangement, even if the power of the imaging lens 6 is small, the light beam can be focused upon the scan surface 8 without enlarging the optical path length (i.e., without increasing the size of the whole system). Here, it should be noted here that the light beam incident on the imaging lens is not limited to a convergent light, and it may be a parallel light.

The surface configuration of the refracting surface of the imaging lens in this embodiment can be expressed as follows.

The point of intersection with the optical axis is taken as an origin while the optical axis direction is taken as an X axis, an axis contained in the main-scan sectional plane and being orthogonal to the optical axis is taken as a Y axis, and an axis contained in the sub-scan sectional plane and being orthogonal to the optical axis is taken as a Z axis. Then, with respect to a meridional-line direction corresponding to the main-scan direction, it can be expressed by:

$$X = \frac{Y^2/R}{1+(1-(1+K)(Y/R)^2)^{1/2}} + B_4 Y^4 + B_6 Y^6 + B_8 Y^8 + B_{10} Y^{10} \quad (1)$$

wherein R is the meridional-line curvature radius on the optical axis, and K, $B_4$, $B_6$, $B_8$ and $B_{10}$ are aspherical coefficients. Furthermore, with respect to a sagittal-line direction corresponding to the sub-scan direction (which is a direction containing the optical axis and perpendicular to the main-scan direction) it can be expressed by:

$$S = \frac{Z^2/r'}{1+(1-(Z/r')^2)^{1/2}} \quad (2)$$

wherein $r' = r_0(1+D_2 Y^2 + D_4 Y^4 + D_6 Y^6 + D_8 Y^8 + D_{10} Y^{10})$, where $r_0$ is the sagittal-line curvature radius on the optical axis and $D_2$, $D_4$, $D_6$, $D_8$ and $D_{10}$ are coefficients. Here, the sagittal-line curvature radius r' out of the optical axis is defined in a plane which contains a normal to the meridional line, at respective positions, and which is perpendicular to the main-scan plane. Although the polynomial regarding the surface configuration expression uses a function up to tenth order, the order may be either higher than it or lower than it. Furthermore, with regard to the surface configuration expression, any other equations may be used provided that similar freedoms in relation to surface expression are available. The advantageous effects of the present invention will be attainable even in that occasion.

Table 1 below shows the optical arrangement of the optical elements as well as the surface configuration of the imaging optical element, in Numerical Example 1 according to the first embodiment of the present invention.

Here, the aspherical coefficients D2u-D10u are coefficients that determine the shape of the lens surface in one of the directions (one of those along the main-scan direction) on the opposite sides of the optical axis. The aspherical coefficients D21-D101 are coefficients that determine the shape of the lens surface in the other of the directions (the other of those along the main-scan direction) on the opposite sides of the optical axis.

It is seen from Table 1 that the aspherical coefficients D2u-D10u are different from the aspherical coefficients D21-D101, and that, inside the effective diameter of the lens surface, the curvature in the sub-scan plane changes asymmetrically about the optical axis, from an on-axis (axial) portion toward an abaxial portion.

TABLE 1

|  |  |  | Scanning Lens Shape | |
|---|---|---|---|---|
| Axial k-θ Coefficient (mm/rad) | kp | 150 | 1st Surface | 2nd Surface |
| Used Wavelength (nm) | λ | 790 R | 7.743E+02 | −1.285E+02 |
| Scanning Lens Refractive Index | N | 1.5 K | 0 | 0 |
| Optical Deflector Incidence Angle (deg) | θi | 90 B4 | −2.227E−07 | 0 |
| Largest Deflection Angle (deg) | θmax | 40 B6 | 4.397E11 | 0 |
| Optical Deflector to Scanning Lens (mm) | S1 | 39.5 B8 | 0 | 0 |
| Scanning Lens Center Thickness (mm) | dp | 9.1 B10 | 0 | 0 |
| Scanning Lens to Scanned Surface (mm) | Sk | 131.1 r | 0 | −1.689E+01 |

TABLE 1-continued

|  |  |  | Scanning Lens Shape | |
|---|---|---|---|---|
|  |  |  | 1st Surface | 2nd Surface |
| Axial k-θ Coefficient (mm/rad) | kp | 150 |  |  |
| Scanning Lens Largest Effective Diameter (mm) | Ymax | 39 | D2 u   0 | 1.886E−04 |
| Scanning Lens Focal Length (mm) | fp | 221.1 | D4 u   0 | −1.919E−08 |
| Collimator Convergence Degree: | ro | 374 | D6 u   0 | 0 |
| Optical Deflector to Natural Convergence Point (mm) |  |  | D8 u   0 | 0 |
|  |  |  | D10 u   0 | 0 |
|  |  |  | D2 l   0 | 2.057E−04 |
|  |  |  | D4 l   0 | −2.265E−08 |
|  |  |  | D6 l   0 | 0 |
|  |  |  | D8 l   0 | 0 |
|  |  |  | D10 l   0 | 0 |

In this embodiment, both the light entrance surface 6a and the light exit surface 6b of the imaging lens 6 are formed with a convex shape.

With respect to the main-scan sectional plane (main-scan direction), the light entrance surface 6a is formed with an aspherical shape (non-arcuate shape) as can be expressed by a function up to sixth order. On the other hand, with respect to the sub-scan sectional plane, it is formed with a flat shape (non-arcuate shape). Here, it should be noted that the shape of the light entrance surface 6a in the sub-scan sectional plane is not limited to flat. An aspherical shape or an elliptical shape may be used, for example.

As regards the light exit surface 6b, with respect to the main-scan sectional plane it is formed with an arcuate shape and, with respect to the sub-scan sectional plane (sub-scan direction) it is formed with an arcuate shape that can be expressed by a function up to fourth order and that has a curvature which changes in accordance with the main-scan direction.

The light entrance surface 6a of the imaging lens of this embodiment has an aspherical shape with respect to the main-scan sectional plane and, with this arrangement, the field curvature with respect to the main-scan direction is well corrected. On the other hand, the light exit surface 6b has an arcuate shape with respect to the sub-scan sectional plane which changes in accordance with the main-scan direction and, in addition to this, the power thereof with respect to the sub-scan direction decreases along the main-scan direction, from an axial portion to an abaxial portion. With this arrangement, the field curvature in the sub-scan direction is well corrected.

In this embodiment, where the refractive index of the material of the imaging lens 6 is denoted by N, the following condition is satisfied.

$$N \leq 1.6 \quad (3)$$

In this embodiment as described above, the material of the imaging lens 6 has a refractive index N=1.5, and this satisfies Condition (3) above. More preferably, Condition (3) should be changed as follows.

$$N \leq 1.55 \quad (3a)$$

In this embodiment, where the largest deflection angle of the optical deflector 5 for the scan within the effective scan width on the scan surface 8 is denoted by θmax, the following condition is satisfied.

$$30° \leq \theta max < 90° \quad (4)$$

In this embodiment, θ=40° and this satisfies Condition (4) above. With this feature, this embodiment is able to meet a wide view angle.

More preferably, Condition (4) may be changed as follows.

$$35° \leq \theta \quad (4a)$$

Furthermore, in this embodiment, where the imaging magnification of the imaging lens 6 on the optical axis with respect to the sub-scan sectional plane (sub-scan magnification) is denoted by βs, the following condition is satisfied.

$$|\beta s| \leq 3.0 \quad (5)$$

In this embodiment, βs=−2.8 and this satisfies Condition (5) above. With this feature of the present embodiment, the shape of the light exit surface with respect to the main-scan sectional plane can be determined so that the sub-scan magnification is constant within the effective image region.

By satisfying Condition (5) in this embodiment, the power of the imaging lens 6 with respect to the sub-scan direction is concentrated to the light exit surface. Furthermore, the sagittal-line curvature radius is changing continuously in the main-scan direction, with the distance from the optical axis. With this arrangement, the field curvature in the sub-scan direction and the sub-scan magnification as well as the uniformness (constant sub-scan magnification) throughout the scan effective region on the scan surface 8 are all well corrected, simultaneously.

More preferably, Condition (5) above may be changed as follows.

$$|\beta s| \leq 2.9 \quad (5a)$$

Furthermore, the following condition may be set.

$$2.0 \leq |\beta| \quad (5b)$$

In that occasion, the effective diameter of the imaging lens couldn't be too large, and the cost of the lens material can preferably be reduced.

As described above, this embodiment satisfies the optical performance as an imaging lens. However, although the optical performance can be satisfied, the lens thickness should be made thin; otherwise the lens molding process becomes difficult to do and, hence, a simple imaging lens and a simple optical scanning system are unattainable.

Figure 14:
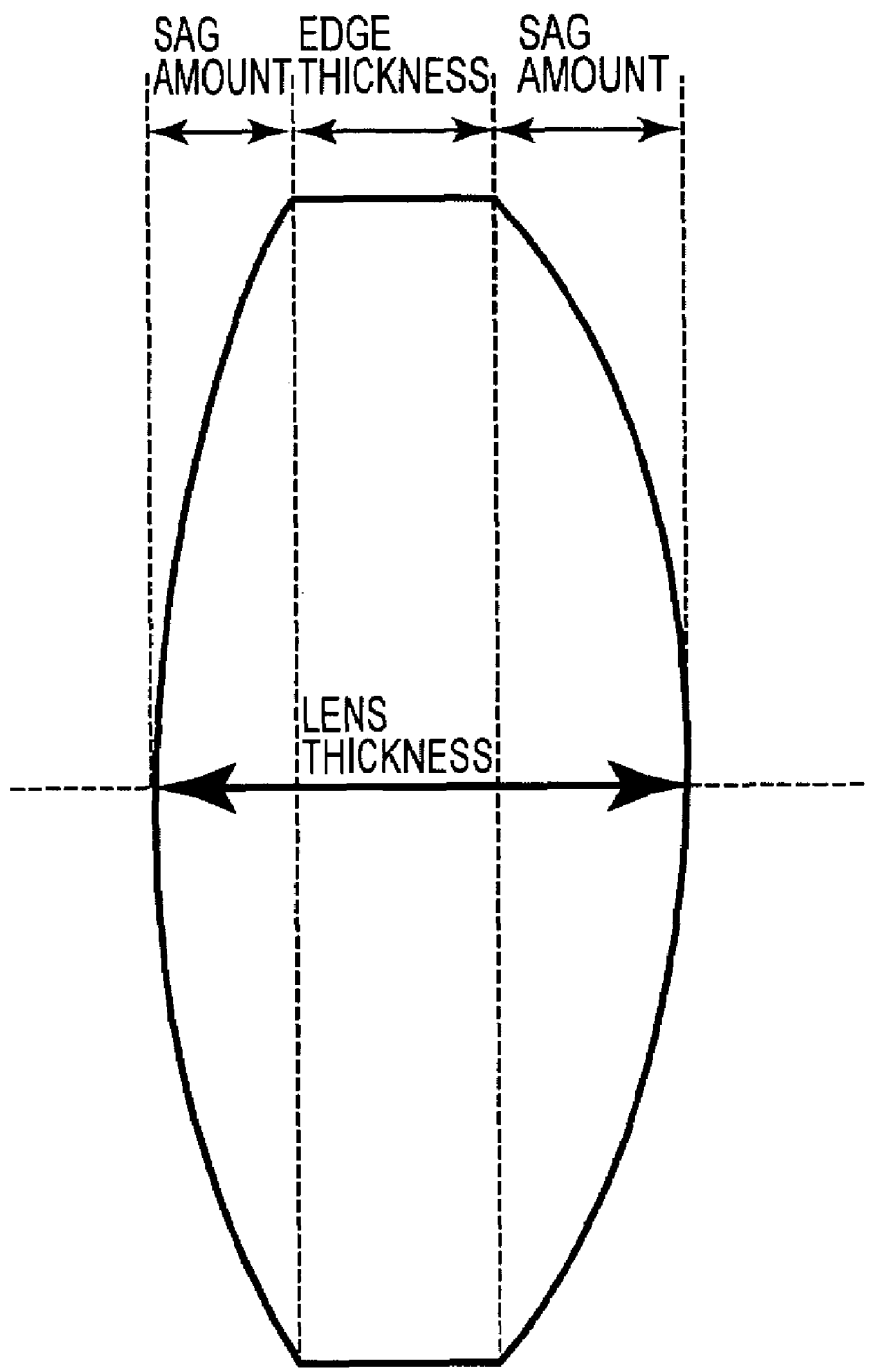
FIG. 14 is a schematic view for explaining the structure of lens thickness.

Referring now to FIG. 14 that illustrates the structure of the lens thickness of the imaging lens, the way how to make the lens thickness thinner will be discussed.

Generally, the center thickness of a lens is determined by the edge thickness and the sag amount. The edge thickness refers to the distance from the light entrance surface to the light exit surface of a lens, at the outermost abaxial portion. Where injection molding is to be carried out using a plastic material or the like, an edge thickness to some extent is necessary to allow that the plastic material is injected into the mold.

On the other hand, the sag amount refers to the distance between a paraxial lens surface and an outermost abaxial lens surface, in the optical axis direction. If the lens has a strong power, the sag amount will be large and the lens thickness will be large.

As described above, since an edge thickness to certain extent is indispensable to the lens production, reducing the lens thickness requires making the sag amount of both of the light entrance surface and the light exit surface smaller.

Making the sag amount small is equivalent to loosening the curvature of the lens in the main-scan direction, in other words, making the power in the main-scan direction smaller. More particularly, if the power of an abaxial portion in the main scan direction is made small, a smaller thickness is obtainable.

In consideration of the above, in this embodiment, the power of an abaxial portion in the main-scan direction is made smaller, by which the sag amount of both of the light entrance surface and the light exit surface is reduced. By this, the lens thickness that can be determined by the edge thickness and the sag amount can be made smaller.

More specifically, in this embodiment, where the power of the imaging optical element at the optical axis with respect to the main-scan direction is denoted by φp, and the power of the imaging optical element at an outermost abaxial portion with respect to the main-scan direction is denoted by φm, the following condition is satisfied.

$$0.5 \leq \phi m / \phi p \leq 0.9 \quad (6)$$

Here, the power φp of the imaging lens at the optical axis with respect to the main-scan direction can be defined as follows, where the refractive index of the material of the imaging lens is denoted by N, the curvature radius of the light entrance surface at the optical axis with respect to the main-scan direction is denoted by $R_{p1}$, the curvature radius of the light exit surface is denoted by $R_{p2}$, and the thickness of the imaging lens at the optical axis is denoted by dp.

$$\varphi_p = (N-1)\left(\frac{1}{R_{p1}} - \frac{1}{R_{p2}}\right) + \frac{(N-1)^2}{N} \frac{d_p}{R_{p1} R_{p2}} \quad (7)$$

Figure 15:
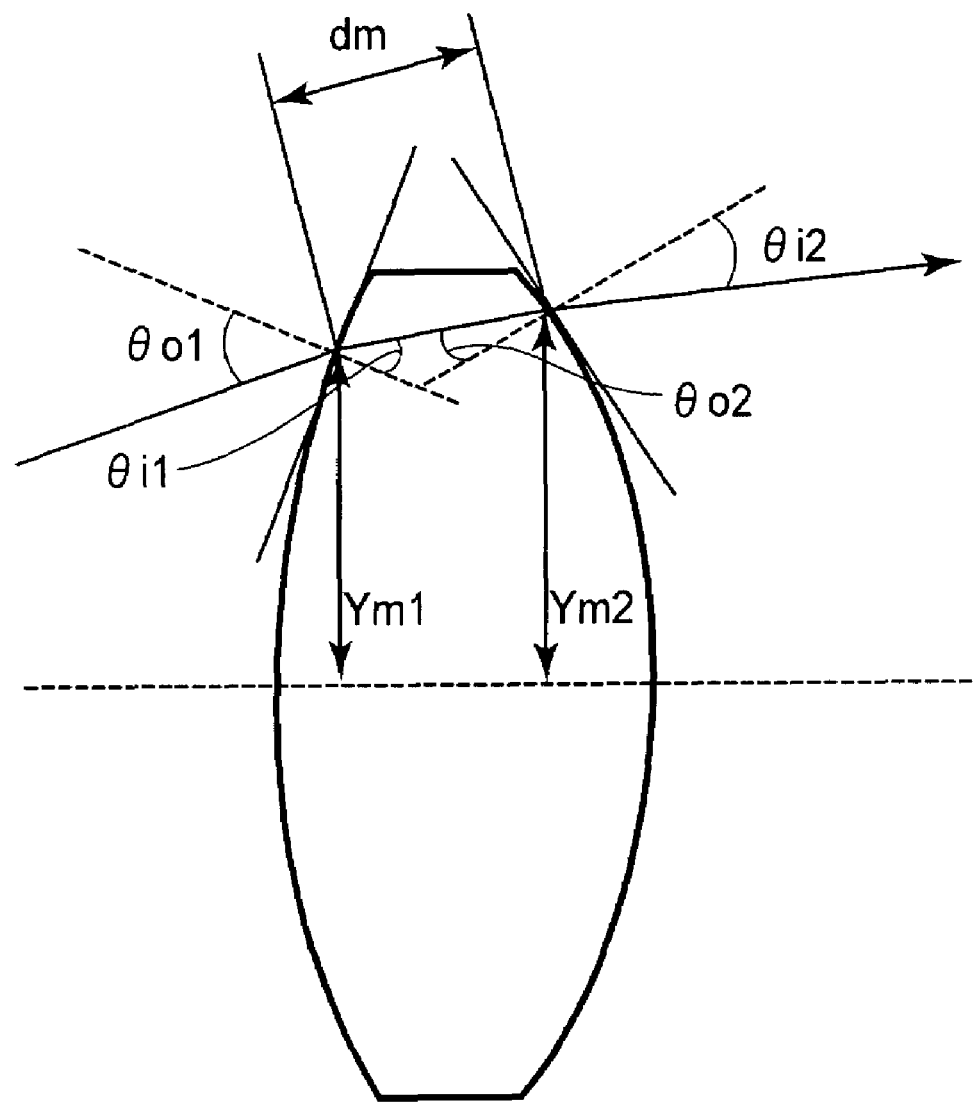
FIG. 15 is a schematic view for explaining the manner of determining the power in the main-scan direction, in an abaxial portion.
Figure 16:
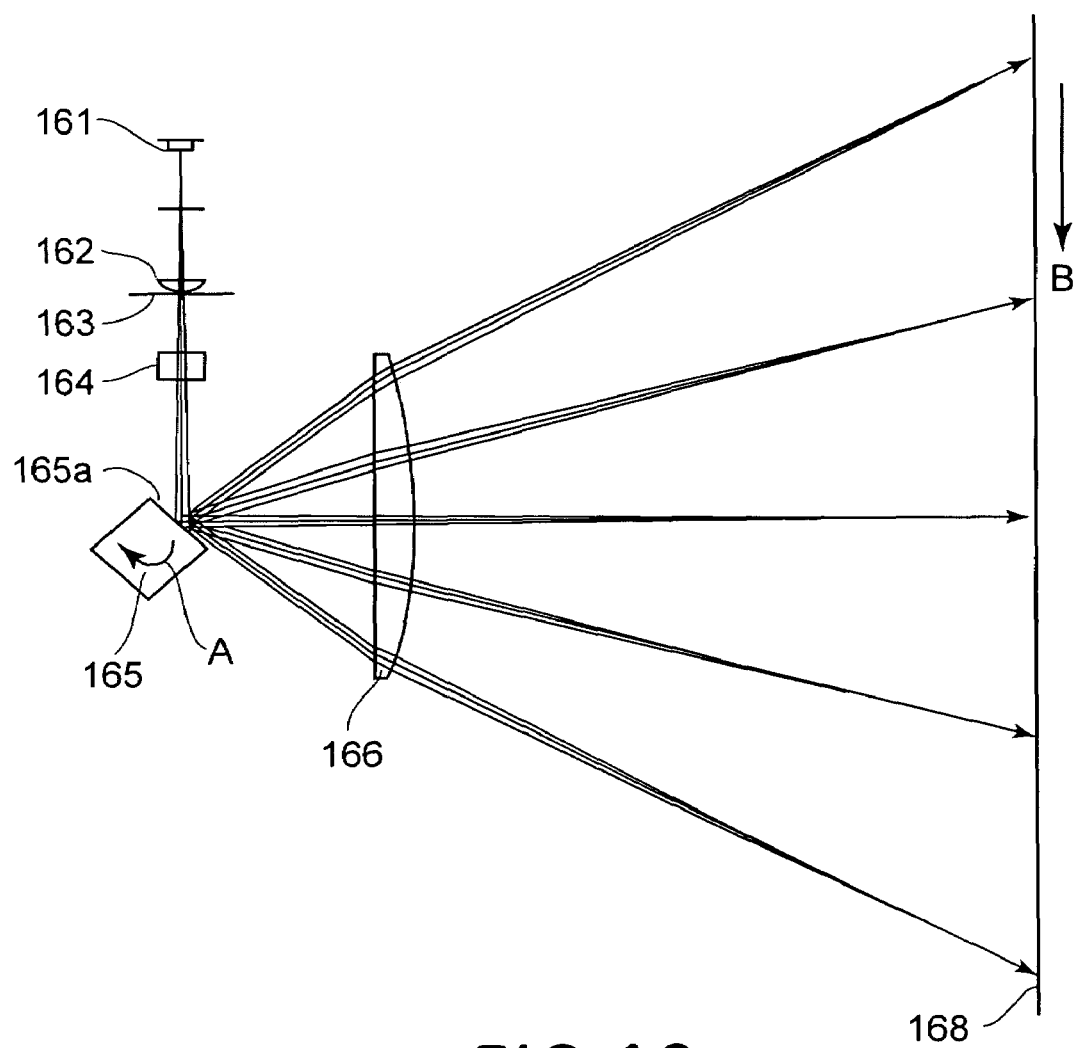
FIG. 16 is a schematic view of a main portion of a conventional optical scanning system.

FIG. 15 is a schematic view for explaining how to determine the power φm of the imaging lens at an abaxial portion with respect to the main-scan direction. In FIG. 15, $R_{m1}$ refers to the curvature radius, in the main scan direction, of the light entrance surface at the largest effective diameter $Y_{m1}$, and $R_{m2}$ refers to the curvature radius of the light exit surface at the largest effective diameter. Further, $\theta_{o1}$ refers to the angle which is defined between the principal ray of the light beam, incident on the light entrance surface at the largest effective diameter, and a normal to the light entrance surface. Also, $\theta_{i1}$ refers to the angle which is defined between the principal ray of the light beam having passed through the light entrance surface and a normal to the light entrance surface. Further, $\theta_{o2}$ refers to the angle which is defined between the principal ray of the light beam in the imaging lens toward the light exit surface, at the largest effective diameter of the light exit surface, and a normal to the light exit surface, and $\theta i2$ refers to the angle which is defined between the principal ray of the light beam having passed through the light exit surface and a normal to the light exit surface. Finally, dm refers to the optical path length from the light entrance surface to the light exit surface, at the outermost abaxial portion. Then, the power φm of the imaging lens at the outermost abaxial portion with respect to the main-scan direction can be defined as follows.

$$\varphi_m = \frac{(N \cos\theta_{o1} - \cos\theta_{i1})}{R_{m1}} + \frac{(N \cos\theta_{o2} - \cos\theta_{i2})}{R_{m2}} - \frac{d_m}{N} \frac{(N \cos\theta_{o1} - \cos\theta_{i1})}{R_{m1}} \frac{(N \cos\theta_{o2} - \cos\theta_{i2})}{R_{m2}} \quad (8)$$

Here, the largest effective diameter refers to the position with respect to the main-scan direction where the principal ray of the light beam, scanning the outermost abaxial portion inside the effective scan region, passes the lens.

Condition (6) mentioned hereinbefore concerns the ratio between the power φp of the imaging lens at the optical axis with respect to the main-scan direction and the power φm of the lens at the outermost abaxial portion with respect to the main scan direction. If the lower limit of Condition (6) is not reached, the power at the outermost abaxial portion with respect to the main-scan direction will be too weak as compared with the power at the optical axis with respect to the main-scan direction, such that the light spot diameter on the scan surface with respect to the main-scan direction would be too large and, hence, superior image formation would be interrupted thereby.

If, on the other hand, the upper limit of Condition (6) is exceeded, the power of the outermost abaxial portion with respect to the main-scan direction will be similar to the power on the optical axis with respect to the main-scan direction. This results in a large lens sag amount of both the light entrance surface and the light exit surface, thus causing enlargement of the lens thickness and difficulties in lens molding. Furthermore, the growth tact will be prolonged, which disadvantageously causes an increase of the cost.

In this embodiment, the ratio between the power φp of the imaging lens on the optical axis with respect to the main-scan direction and the power φm of the lens at the outermost abaxial portion with respect to the main-scan direction is φm/φp=0.81, and this satisfies Condition (6).

Hence, in this embodiment, by satisfying Condition (6), the power of the outermost abaxial portion with respect to the main-scan direction is made weaker than the power on the optical axis with respect to the main-scan direction. With this arrangement, the sag amount of both the light entrance surface and the light exit surface can be made smaller and, hence, the lens thickness can be made thinner.

More preferably, the numerical range of Condition (6) may be changed as follows.

$$0.55 \leq \phi m / \phi p \leq 0.85 \quad (6a)$$

The center thickness of the imaging lens of this embodiment is 9.1 mm which is thinner than conventional imaging lenses. Hence, in this embodiment, influences of birefringence, GI and so on due to the plastic molding can be reduced and also the spot diameter can be made smaller. Furthermore, the lens molding time can be shortened. Hence, an optical scanning system suitable for high-precision printing is accomplished.

On the other hand, by weakening the power at the abaxial portion with respect to the main-scan direction, the k-θ characteristic becomes "under". The k-θ characteristic means that there is a relation effective to focus the light beam, incident with a view angle (scan angle) of θ, upon the image plane (scan surface 8) at a position of Y=kpxθ, where Y is the height from the optical axis and kp is a constant. In other words, it refers to a characteristic that the scan width (scan speed) to be scanned per unit view angle is even throughout the scan surface. The constant kp is called a k-θ coefficient. If the light beam incident on the lens is parallel light, the constant kp takes the same value as the paraxial focal length fp and the system has an f-θ characteristic. In that case, fp is called also as f-θ coefficient.

In this embodiment, the k-θ characteristic is "under". Namely, the constant kp changes with the image height.

In order that an imaging lens has such k-θ characteristic, the scan width at the abaxial portion per unit view angle has to be equal to the scan width on the optical axis per unit view angle. To this end, as compared with the power on the optical axis in the main-scan direction, the power in the main-scan direction at the abaxial portion should be strong to some extent.

Since in this embodiment the power at the abaxial portion with respect to the main-scan direction is weak, the k-θ characteristic of the imaging lens is "under". However, it doesn't matter because it can be corrected simply by electric signal processing.

Where the thickness of the imaging lens at the optical axis is denoted by dp and the k-θ coefficient on the optical axis is denoted by kp, in this embodiment the following condition is satisfied.

$$0 < dp/kp \leq 0.09 \quad (9)$$

Condition (9) above concerns the ratio between the thickness dp of the imaging lens at the optical axis and the axial k-θ coefficient kp. If Condition (9) is not satisfied, the lens thickness increases, causing a difficulty in lens molding.

In this embodiment, the ratio between the thickness dp of the imaging lens at the optical axis and the axial k-θ coefficient is dp/kp=0.06, and this satisfies Condition (9).

More preferably, the numerical range of Condition (9) may be changed as follows.

$$0.02 < dp/kp \leq 0.07 \quad (9a)$$

If the power at the abaxial portion with respect to the main-scan direction is made weaker than the power on the optical axis with respect to the main-scan direction as described hereinbefore, the scan speed in the abaxial portion becomes faster than the scan speed at the optical axis. In consideration of this, in this embodiment, where the scan speed on the optical axis, upon the scan surface, is denoted by Vp and the scan speed in the outermost abaxial portion is denoted by Vm, the following condition is satisfied.

$$1 \leq Vm/Vp \leq 1.5 \quad (10)$$

The fact that the scan speed Vm at the outermost abaxial portion is faster than the scan speed Vp at the optical axis means that, when the k-θ coefficient on the optical axis is denoted by kp and the k-θ coefficient at the outermost abaxial portion is denoted by km, there is a relation kp<km.

Condition (10) above concerns the ratio between the scan speed Vp on the optical axis, upon the scan surface, and the scan speed Vm at the outermost abaxial portion. If the lower limit of Condition (10) is not reached, the scan speed of the outermost abaxial portion with respect to the main-scan direction will be similar to the scan speed at the optical axis with respect to the main-scan direction. This results in enlargement of the lens thickness and difficulties in lens molding. Furthermore, the growth tact will be prolonged, which disadvantageously causes an increase of the cost.

If the upper limit of Condition (10) is exceeded, the scan speed at the outermost abaxial portion with respect to the main-scan direction will be too fast as compared with the scan speed at the optical axis with respect to the main-scan direction, such that the light spot diameter in the main-scan direction upon the scan surface would be too large and, hence, superior image formation would be interrupted thereby.

In this embodiment, by satisfying Condition (10), the scan speed of the outermost abaxial portion with respect to the main-scan direction is made faster than the scan speed on the optical axis with respect to the main-scan direction, and the k-θ characteristic becomes "under". With this arrangement, the sag amount of the imaging lens can be made smaller and, hence, the lens thickness can be made thinner.

In this embodiment, the ratio between the scan speed Vp on the optical axis and the scan speed Vm at the outermost abaxial portion is Vm/Vp=1.16, and this satisfies Condition (10).

More preferably, the numerical range of Condition (10) mentioned above may be changed as follows.

$$1.15 \leq Vm/Vp \leq 1.45 \quad (10a)$$

Furthermore, in this embodiment, if the k-θ characteristic becomes "under", the third-order (tertiary) distortion aberration coefficient V will be deviated from the value V=⅔ in the case where the k-θ characteristic is kept. In consideration of it, when the third-order distortion aberration coefficient of the imaging lens is denoted by V, the following condition is satisfied.

$$0.1 \leq V \leq 0.5 \quad (11)$$

The third-order distortion aberration coefficient V mentioned above can be expressed by the following equation. That is, the distance of the light beam incident on the optical deflector, from the deflecting surface of the optical deflector to the natural convergence point, is denoted by $r_0$, the distance along the optical axis from the deflecting surface to the scan surface is denoted by L, and the distance along the optical axis from the deflecting surface to the light entrance surface of the imaging lens is denoted by $S_1$. Further, the refractive index of the material of the imaging lens is denoted by N, the curvature radius of the light entrance surface of the imaging lens is denoted by R1, and the power of the imaging lens on the optical axis with respect to the main-scan direction is denoted by φ. Then, a relation below is given.

$$V = \left(\frac{S_1(r_0 - S_1)}{r_0 L}\right)^3 \left(\left(\left(\frac{N}{N-1}\right)^2 \varphi^3 + \right.\right. \quad (12)$$

$$\left.\frac{3N-1}{N-1}\frac{L}{r_0-S_1}\varphi^2 + \frac{3N+2}{N}\left(\frac{L}{r_0-S_1}\right)^2 \varphi\right) -$$

$$\frac{1}{R_1}\left(\frac{2N+1}{N-1}\varphi^2 + \frac{4(N+1)}{N}\frac{L}{r_0-S_1}\varphi\right) + \left(\frac{1}{R_1}\right)^2 \frac{N+2}{N}\varphi\right) +$$

$$3\left(\frac{S_1(r_0-S_1)}{r_0 L}\right)^2 \left(-\left(\frac{N}{N-1}\varphi^2 + \frac{2N+1}{N}\frac{L}{r_0-S_1}\varphi\right) + \frac{1}{R_1}\frac{N+1}{N}\varphi\right) +$$

$$\frac{S_1(r_0-S_1)}{r_0 L}\left(3\varphi L + \frac{\varphi L}{N}\right)$$

The above-described third-order distortion aberration coefficient V is calculated from the parameter values shown in Table 1.

Condition (11) mentioned above regulates the third-order distortion aberration coefficient V of the imaging lens. If the lower limit of Condition (11) is not reached, the spot diameter on the scan surface with respect to the main-scan direction will be too large, and satisfactory image formation would be interrupted. Furthermore, if V=0, then the imaging lens disadvantageously has an f-tanθ characteristic. On the other hand, if the upper limit of Condition (11) is exceeded, the lens thickness will be too large, causing a difficulty in lens molding. Moreover, the growth tact will be prolonged, which leads to an increase of the cost. Further, if V=⅔, then the imaging lens disadvantageously has an f-θ characteristic, and this leads to further increase of the lens thickness.

In this embodiment, by satisfying Condition (11), the scan speed at the abaxial portion with respect to the main-scan direction is made faster than the scan speed at the optical axis with respect to the main-scan direction. With this arrangement, the sag amount of the imaging lens can be reduced, and the lens thickness can be made thinner.

In this embodiment, the third-order distortion coefficient V is V=0.33, and this satisfies Condition (11).

More preferably, the numerical range of Condition (11) may be changed as follows.

$$0.15 \leq V \leq 0.45 \quad (11a)$$

Figure 3A:
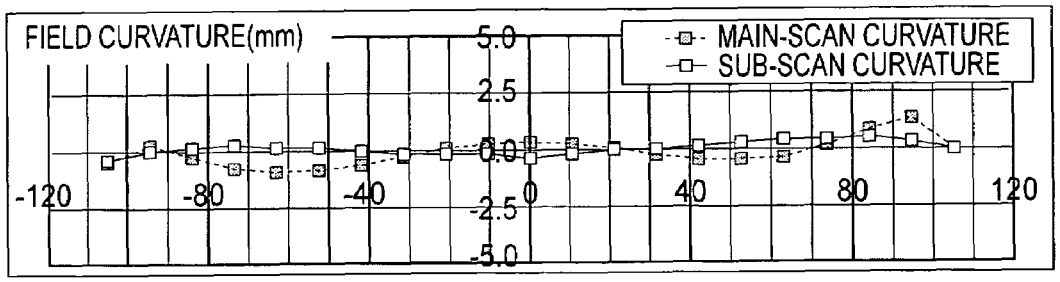
FIGS. 3A-3C are graphs for explaining geometrical aberrations and sub-scan magnification difference, in the first embodiment of the present invention.
Figure 3B:
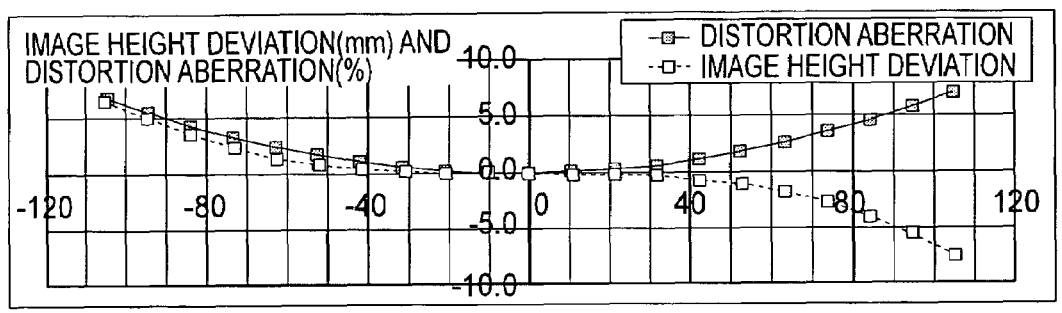
Figure 3C:
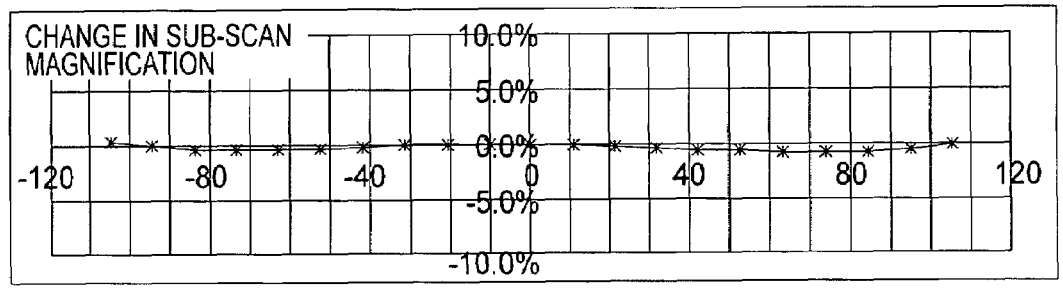

FIGS. 3A-3C illustrate geometrical aberration and uniformness of sub-scan magnification of the imaging optical element (imaging lens) with the image height. It is seen from these drawings that the aberrations are well corrected to a practicable level, and that the change in the sub-scan magnification due to the image height is suppressed to 2% or less. Here, the change in sub-scan magnification with the image height should desirably be 10% or less and, more preferably, 5% or less.

Figure 4:
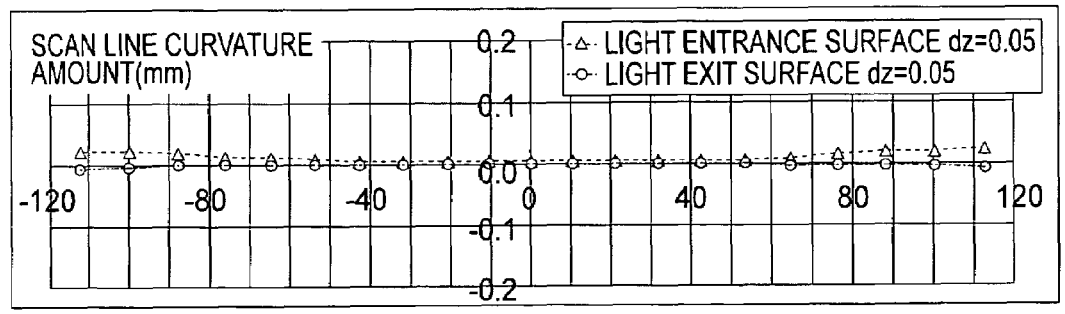
FIG. 4 is a graph for explaining the scan-line displacement when an imaging optical element of the first embodiment of the present invention is being deviated.

FIG. 4 illustrates the amount of displacement of the scan line (in Z direction) upon the scan surface as each optical surface of the imaging lens of this embodiment deviates in the Z direction (deviation amount is 50 μm). It is seen from FIG. 4 that the amount of curvature (bend) of the scan line in that occasion is small.

Namely, it is seen from FIG. 4 that, even if the imaging lens as a whole shifts in a direction (Z direction) perpendicular to the scan surface due to an error of mounting the lens onto an optical casing (barrel) or an error in the lens production itself, for example, the scan-line bend due to the lens eccentricity can be avoided by making the imaging lens shape quite simple without any inflection point and by making the sub-scan magnification of the imaging lens constant.

Furthermore, it is seen from FIG. 4 that, even if a deviation of the light exit surface in the Z direction relative to the light entrance surface is produced due to insufficient mounting precision of a mold, particularly in the case of mold lens, the scan-line bend due to the eccentricity to the sub-scan direction, upon the scan surface, can be similarly avoided by making the imaging lens shape quite simple without any inflection point and by making the sub-scan magnification of the surfaces of the imaging lens constant.

In this embodiment as described above, the imaging optical system LB is provided by a single imaging lens 6, and the power of the abaxial portion with respect to the main-scan direction is made weaker than the power on the optical axis with respect to the main-scan direction. Furthermore, the scan speed at the abaxial portion with respect to the main-scan direction is made faster than the scan speed at the optical axis with respect to the main-scan direction, to make the k-θ characteristic "under" to thereby reduce the sag amount of the imaging lens in the abaxial portion. With this feature of this embodiment, the center thickness of the imaging lens 6 in the optical axis direction is made thinner. Thus, yet through a simple structure, the scan-line bend due to the eccentricity of the lens surface of the imaging lens is reduced.

Embodiment 2

Figure 5:
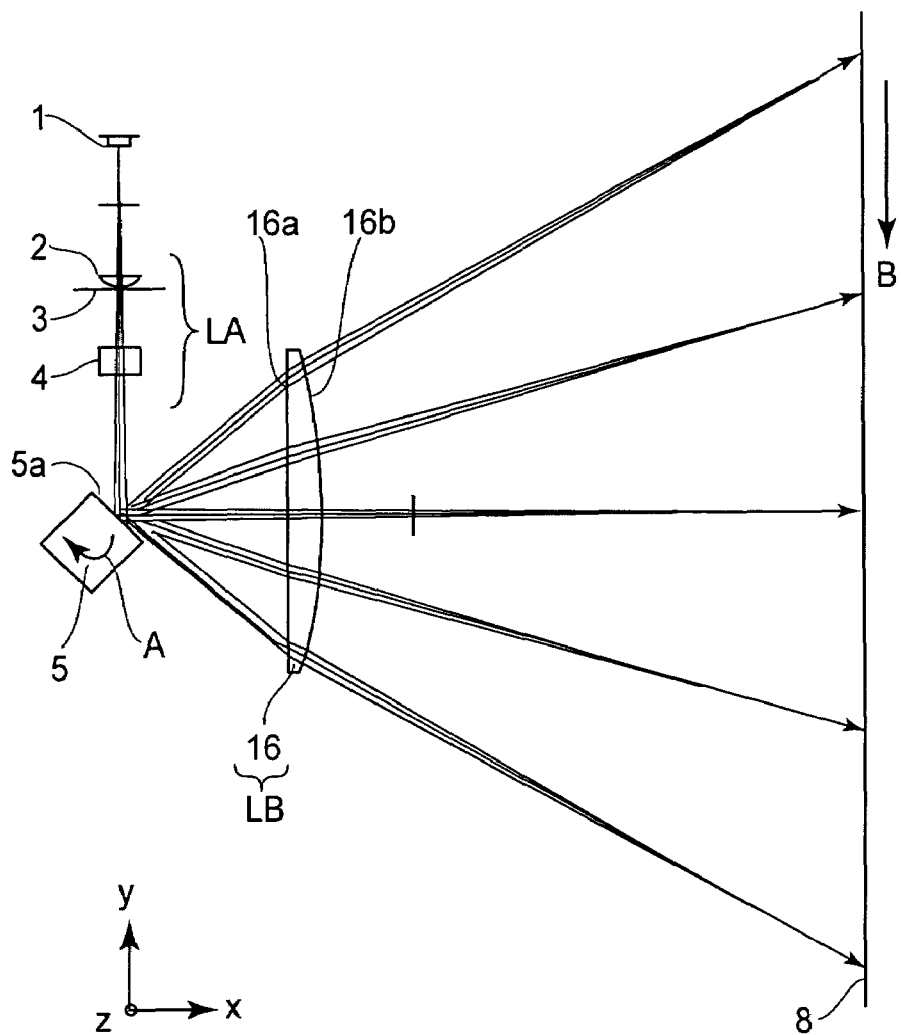
FIG. 5 is a schematic view, along a main-scan sectional plane, of an optical scanning system according to a second embodiment of the present invention.
Figure 6:
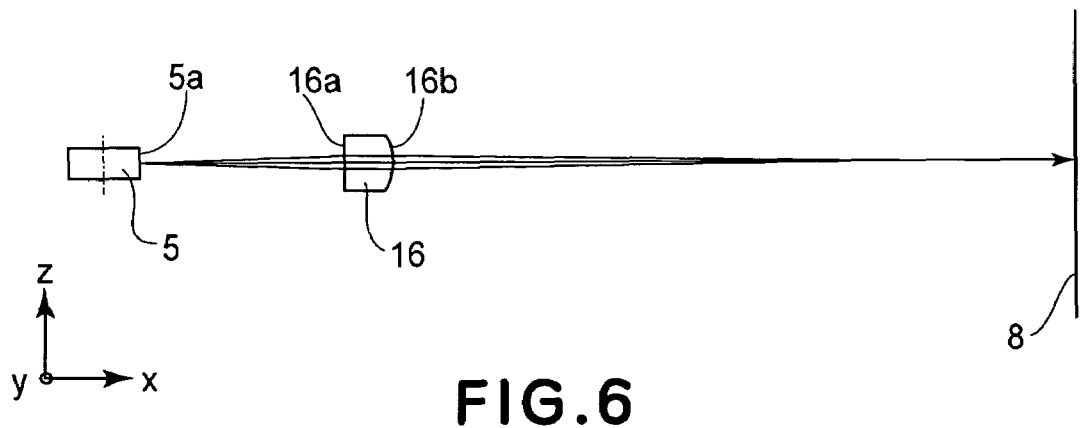
FIG. 6 is a schematic view, along a sub-scan sectional plane, of the optical scanning system according to the second embodiment of the present invention.

FIG. 5 is a schematic view, along a main-scan sectional plane, of an optical scanning system according to a second embodiment of the present invention, and FIG. 6 is a schematic view, along a sub-scan sectional plane, of the optical scanning system according to the second embodiment of the present invention. In FIGS. 5 and 6, the components corresponding to those shown in FIG. 1 or 2 are denoted by like numerals.

This embodiment differs from the first embodiment in that the light entrance surface 16a the light exit surface 16b of the imaging lens 16 are formed with different shapes. The structure and optical function of the remaining portion are similar to those of the first embodiment, and similar advantageous results are obtainable in this embodiment.

More specifically, in FIGS. 5 and 6, denoted at LB is an imaging optical system (scanning optical system) having a light collecting function and a k-θ characteristic. The imaging optical system is provided by a single imaging lens (k-θ lens) 16. Both of the light entrance surface 16a and the light exit surface 16b of the imaging lens 16 of this embodiment are formed with a convex shape.

More specifically, the light entrance surface 16a is formed with an aspherical shape, with respect to the main-scan sectional plane, that can be expressed in terms of a function up to sixth order. With respect to the sub-scan sectional plane, it is formed with a flat shape. On the other hand, with respect to the main-scan sectional plane, the light exit surface 16b is formed with an arcuate shape and, with respect to the sub-scan sectional plane, it is formed with an arcuate shape that can be expressed by a function up to fourth order and having a curvature which is changing in accordance with the main-scan direction.

In this embodiment, the shapes of the light entrance surface 16a and the light exit surface 16b of the imaging lens 16 are so set that, as compared with the power on the optical axis with respect to the main-scan direction, the power at the abaxial portion with respect to the main-scan direction is reduced further than in the first embodiment. With this feature of the present embodiment, as compared with the first embodiment, the center thickness of the imaging lens 16 in the optical axis direction can be made much thinner.

Table 2 below shows the optical arrangement of the optical elements as well as the surface configuration of the imaging optical element, in Numerical Example 2 according to the second embodiment of the present invention.

TABLE 2

| | | | Scanning Lens Shape | | |
|---|---|---|---|---|---|
| Axial k-θ Coefficient (mm/rad) | kp | 150 | | 1st Surface | 2nd Surface |
| Used Wavelength (nm) | λ | 790 | R | 6.710E+02 | -2.026E+02 |
| Scanning Lens Refractive Index | N | 1.5 | K | 0 | 0 |
| Optical Deflector Incidence Angle (deg) | θi | 90 | B4 | -3.338E-07 | 0 |
| Largest Deflection Angle (deg) | θmax | 40 | B6 | 5.838E-11 | 0 |
| Optical Deflector to Scanning Lens (mm) | S1 | 39.2 | B8 | 0 | 0 |
| Scanning Lens Center Thickness (mm) | dp | 7 | B10 | 0 | 0 |
| Scanning Lens to Scanned Surface (mm) | Sk | 123.4 | r | 0 | -1.617E+01 |
| Scanning Lens Largest Effective Diameter (mm) | Ymax | 40 | D2 u | 0 | 2.620E-04 |
| Scanning Lens Focal Length (mm) | fp | 312.4 | D4 u | 0 | -2.778E-08 |
| Collimator Convergence Degree: | ro | 250 | D6 u | 0 | 0 |
| Optical Deflector to Natural | | | D8 u | 0 | 0 |
| Convergence Point (mm) | | | D10 u | 0 | 0 |
| | | | D2 l | 0 | 2.840E-04 |
| | | | D4 l | 0 | -3.471E-08 |
| | | | D6 l | 0 | 0 |
| | | | D8 l | 0 | 0 |
| | | | D10 l | 0 | 0 |

The sub-scan magnification of the imaging lens 16 on the optical axis, according to this embodiment, is $\beta s=-2.8$, and this satisfies Condition (5) described hereinbefore. In this embodiment, by satisfying Condition (5), the shape of the light exit surface in the main-scan sectional plane is determined so that the sub-scan magnification inside the effective image region is held constant.

Furthermore, the ratio between the power $\phi p$ of the imaging lens 16 on the optical axis, with respect to the main-scan direction, and the power $\phi m$ thereof at the outermost abaxial portion, with respect to the main-scan direction, is $\phi m/\phi p=0.58$, and this satisfies Condition (6). By this, the sag amount of the imaging lens 16 can be made small, and the center thickness of the imaging lens 16 can be made thinner.

Furthermore, since in this embodiment the power at the abaxial portion with respect to the main-scan direction is weak as in the first embodiment, the k-θ characteristic of the imaging lens is "under". However, this doesn't matter because it can be corrected simply by electric signal processing.

The ratio between the thickness dp of the imaging lens 16 on the optical axis and the k-θ coefficient kp on the optical axis, in this embodiment, is $dp/kp=0.05$, and this satisfies Condition (9) mentioned hereinbefore.

The ratio between the scan speed Vp on the optical axis and the scan speed Vm at the outermost abaxial portion is $Vm/Vp=1.29$, and this satisfies Condition (10) mentioned hereinbefore.

The third-order distortion aberration coefficient V in this embodiment is $V=0.22$, and this satisfies Condition (11) mentioned hereinbefore.

Figure 7A:
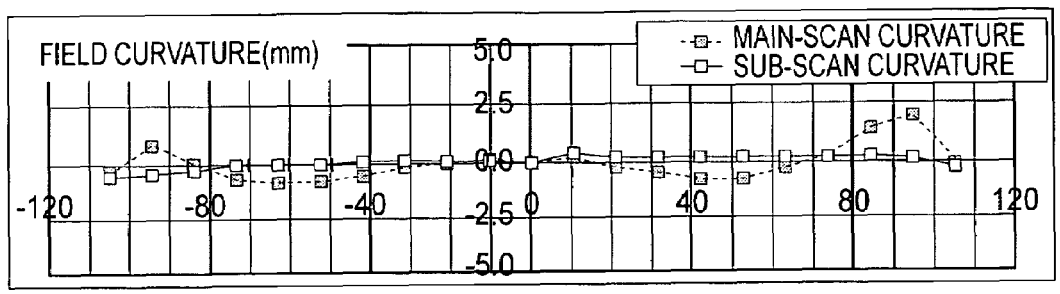
FIGS. 7A-7C are graphs for explaining geometrical aberrations and sub-scan magnification difference, in the second embodiment of the present invention.
Figure 7B:
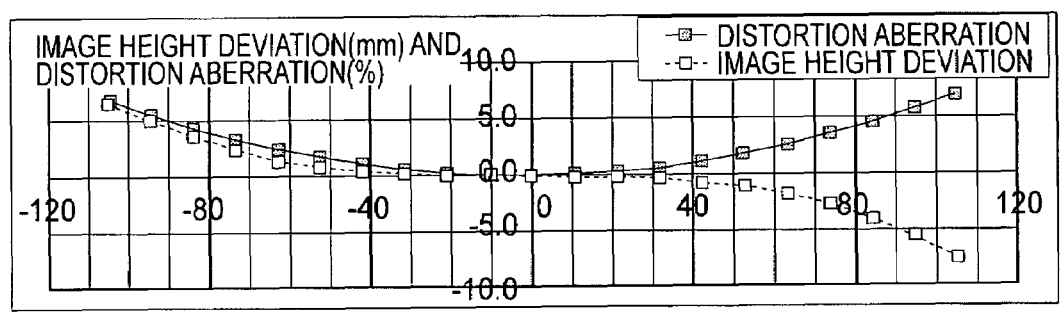
Figure 7C:
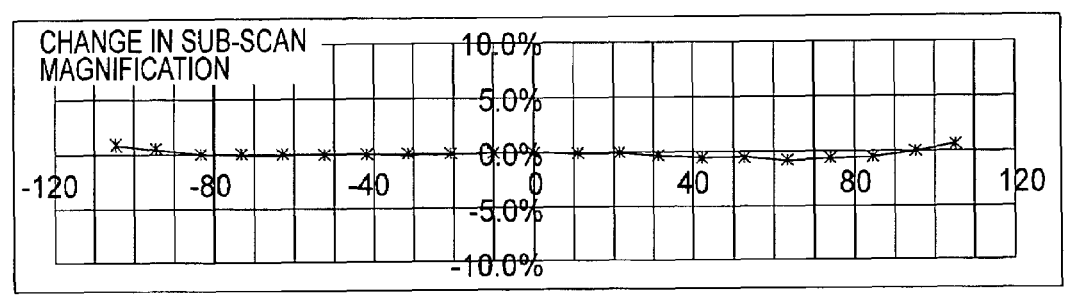

FIGS. 7A-7C illustrate geometrical aberration and uniformness of sub-scan magnification of the imaging optical element (imaging lens) with the image height. It is seen from these drawings that the aberrations are well corrected up to a practicable level, and that the change in the sub-scan magnification due to the image height is suppressed to 5% or less. Here, the change in sub-scan magnification with the image height should be 10% or less and, more preferably, 5% or less.

In accordance with this embodiment of the present invention, the components are set as described above by which an imaging lens and an optical scanning system which is thinner and simpler in structure as compared with the first embodiment can be provided.

Embodiment 3

Figure 8:
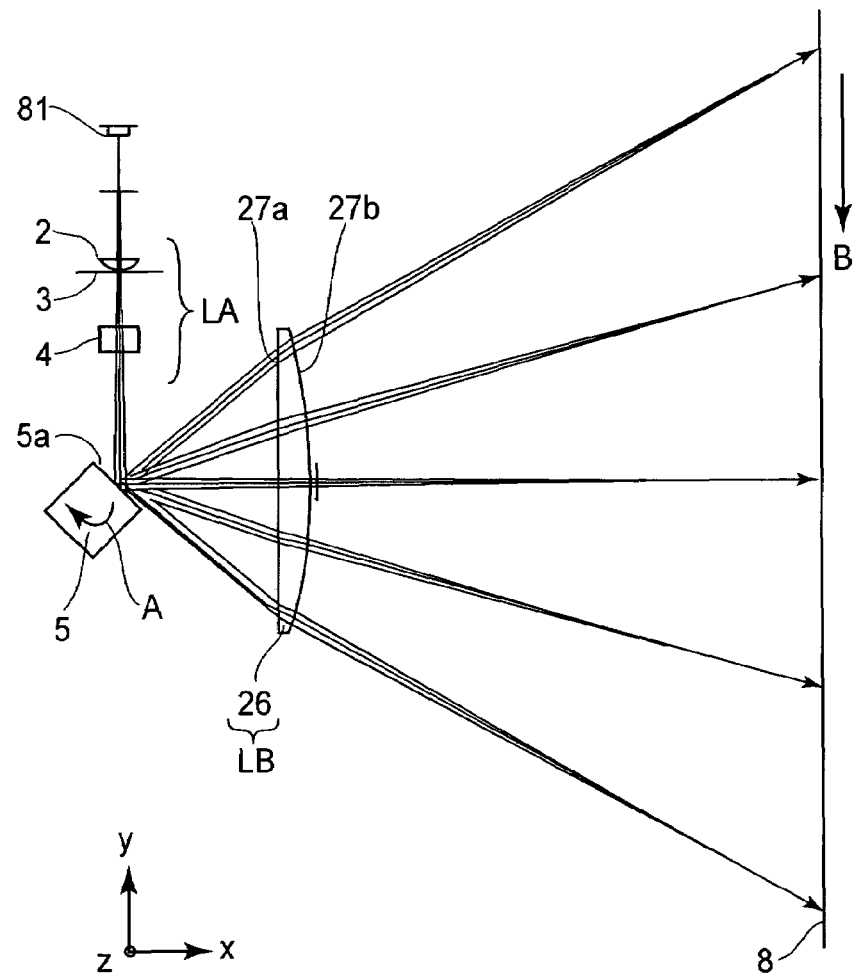
FIG. 8 is a schematic view, along a main-scan sectional plane, of an optical scanning system according to a third embodiment of the present invention.
Figure 9:
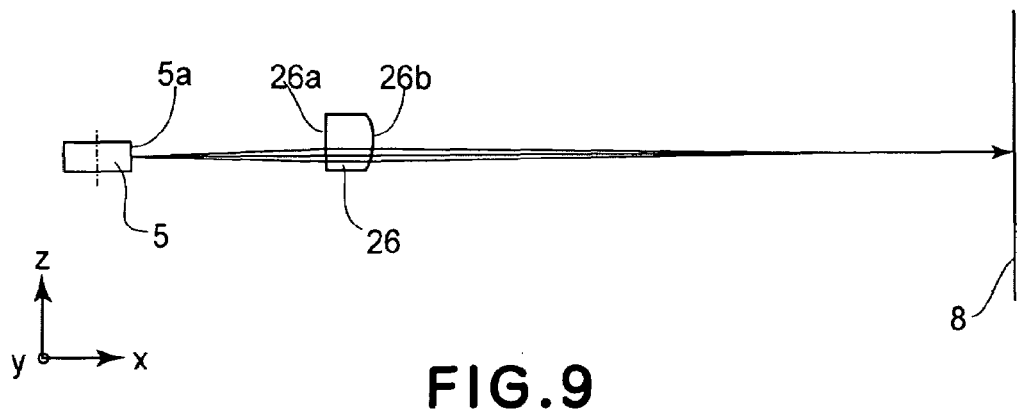
FIG. 9 is a schematic view, along a sub-scan sectional plane, of the optical scanning system according to the third embodiment of the present invention.

FIG. 8 is a schematic view, along a main-scan sectional plane, of an optical scanning system according to a third embodiment of the present invention, and FIG. 9 is a schematic view, along a sub-scan sectional plane, of the optical scanning system according to the second embodiment of the present invention. In FIGS. 8 and 9, the components corresponding to those shown in FIG. 1 or 2 are denoted by like numerals.

This embodiment differs from the first embodiment in that light source means 81 comprises a multi-beam laser and that the light beam emitted from the light source means 81 is projected, with respect to the sub-scan sectional plane, upon the deflecting surface 5a of an optical deflector 5 in an oblique direction. Furthermore, the light entrance surface and the light exit surface of an imaging lens 26 have different shapes, and the optical scanning system is incorporated into a color image forming apparatus. The structure and optical function of the remaining portion are similar to those of the first embodiment, and similar advantageous results are obtainable likewise.

More specifically, in FIGS. 8 and 9, denoted at 81 is the light source means which comprises a multi-beam laser having a plurality of light emitting portions (light emitting points). The multi-beam laser 81 of this embodiment provides simultaneous emission of plural light beams (four in this embodiment, but only one beam is illustrated in the drawings) which are modulated independently of each other.

Denoted at LB is an imaging optical system (scanning optical system) having a light collecting function and a k-θ characteristic. It consists of a single imaging lens (k-θ lens) 26. In this embodiment, both the light entrance surface 26a and the light exit surface 26b of the imaging lens 26 are formed with a convex shape.

The light entrance surface 26a is formed with an aspherical shape in the main-scan sectional plane that can be expressed by a function up to tenth order. On the other hand, with respect to the sub-scan sectional plane, it is formed with an arcuate shape being expressed by a function up to tenth order and having a curvature which changes in accordance with the main-scan direction. The light exit surface 26b has an arcuate shape in the main-scan sectional plane and, with respect to the sub-scan sectional plane, it is formed with an aspherical shape being expressed by a function up to tenth order and having a curvature which changes in accordance with the main-scan direction, and expressed by a fourth-order function.

In this embodiment, four light beams emitted from the light source means 81 are projected by an input optical system LA onto the deflecting surface 5a of the optical deflector 5, in an oblique direction with respect to the sub-scan sectional plane.

Then, the four light beams deflected by the deflecting surface 5a of the optical deflector 5 are directed by the imaging lens 26 to associated photosensitive drum surfaces 8 (only one photosensitive drum surface is illustrated in the drawings), respectively, whereby imagewise signals (imagewise-data) of different colors are recorded such that high-speed color image printing is accomplished.

In this embodiment, the light exit surface 26b of the imaging lens 26 is formed with an aspherical surface shape with respect to the sub-scan sectional plane. By this, rotation of the light spot on the scan surface 8 which may be caused when the four light beams from the light source means 81 are obliquely incident on the deflecting surface 5a of the optical deflector 5 with respect to the sub-scan sectional plane, can be corrected.

Table 3 below shows the optical arrangement of the optical elements as well as the surface configuration of the imaging optical element, in Numerical Example 3 according to the third embodiment of the present invention.

TABLE 3

| | | | | Scanning Lens Shape | |
|---|---|---|---|---|---|
| | | | | 1st Surface | 2nd Surface |
| Axial k-θ Coefficient (mm/rad) | kp | 150 | | | |
| Used Wavelength (nm) | λ | 790 | R | 7.024E+02 | −1.314E+02 |
| Scanning Lens Refractive Index | N | 1.5 | K | 7.37E+01 | 0 |
| Optical Deflector Incidence Angle (deg) | θi | 90 | B4 | −2.671E−07 | 0 |
| Largest Deflection Angle (deg) | θmax | 40 | B6 | 4.478E−11 | 0 |
| Optical Deflector to Scanning Lens (mm) | S1 | 39.5 | B8 | 5.43E−15 | 0 |
| Scanning Lens Center Thickness (mm) | dp | 9.1 | B10 | −2.49E−18 | 0 |
| Scanning Lens to Scanned Surface (mm) | Sk | 131.2 | r | −1.50E+01 | −9.72E+00 |
| Scanning Lens Largest Effective Diameter (mm) | Ymax | 39 | D2 | 9.17E−04 | 0 |
| Scanning Lens Focal Length (mm) | fp | 222.2 | D4 | −4.61E−08 | 0 |
| Collimator Convergence Degree: | ro | 374 | D6 | 8.29E−13 | 0 |
| Optical Deflector to Natural Convergence Point (mm) | | | D8 | 4.04E−14 | 0 |
| Oblique Incidence Angle | θs | 3 | D10 | −4.12E−17 | 0 |
| | | | E2 u | 0 | 2.20E−04 |
| | | | E4 u | 0 | −2.97E−04 |
| | | | E6 u | 0 | 1.53E−12 |
| | | | E8 u | 0 | 9.65E−15 |
| | | | E10 u | 0 | −8.49E−18 |
| | | | E2 l | 0 | 2.27E−04 |
| | | | E4 l | 0 | −2.97E−08 |
| | | | E6 l | 0 | 1.29E−12 |
| | | | E8 l | 0 | 4.85E−15 |
| | | | E10 l | 0 | −5.12E−18 |
| | | | C40 | 0 | 1.12E−04 |
| | | | C42 | 0 | −6.85E−08 |
| | | | C44 | 0 | 2.21E−11 |

As the aspherical component in the sub-scan direction, in this embodiment, a value determined by the following equation is added to Equation (2) mentioned hereinbefore.

$$S = C_{4\text{-}0} z^4 + C_{4\text{-}2} z^4 y^2 + C_{4\text{-}4} z^4 y^4 \tag{13}$$

By adding this aspherical component to the lens surface, rotation of the light spot on the scan surface which may be caused when the four light beams from the light source means 81 are obliquely incident on the deflecting surface 5a of the optical deflector 5 with respect to the sub-scan sectional plane, can be corrected.

The sub-scan magnification of the imaging lens 26 on the optical axis, according to this embodiment, is $\beta s = -2.5$, and this satisfies Condition (5) described hereinbefore. In this embodiment, by satisfying Condition (5), the shape of the light exit surface with respect to the main-scan sectional plane is determined so that the sub-scan magnification inside the effective image region is held constant.

Furthermore, the ratio between the power $\phi p$ of the imaging lens 26 on the optical axis, with respect to the main-scan direction, and the power $\phi m$ thereof at the outermost abaxial portion with respect to the main-scan direction, is $\phi m/\phi p = 0.82$, and this satisfies Condition (6). By this, the sag amount of the imaging lens 26 can be made small, and the center thickness of the imaging lens 26 can be made thinner.

Furthermore, since in this embodiment the power at the abaxial portion with respect to the main-scan direction is weak as in the first embodiment, the k-θ characteristic of the imaging lens is "under". However, this doesn't matter because it can be corrected simply by electric signal processing.

The ratio between the thickness dp of the imaging lens on the optical axis and the k-θ coefficient kp on the optical axis, in this embodiment, is dp/kp=0.06, and this satisfies Condition (9) mentioned hereinbefore.

The ratio between the scan speed Vp on the optical axis and the scan speed Vm at the outermost abaxial portion is Vm/Vp=1.18, and this satisfies Condition (10) mentioned hereinbefore.

The third-order distortion aberration coefficient V in this embodiment is V=0.33, and this satisfies Condition (11) mentioned hereinbefore.

Figure 10A:
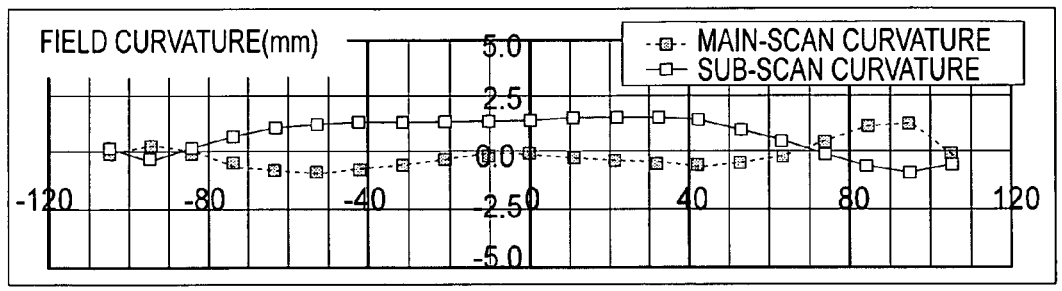
FIGS. 10A-10C are graphs for explaining geometrical aberrations and sub-scan magnification difference, in the third embodiment of the present invention.
Figure 10B:
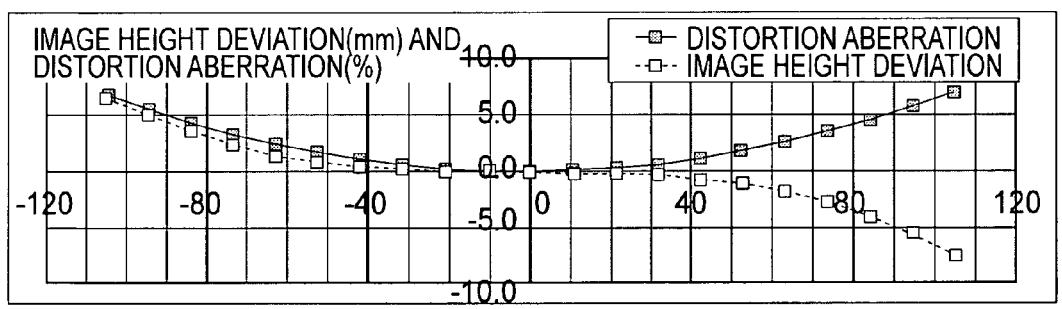
Figure 10C:
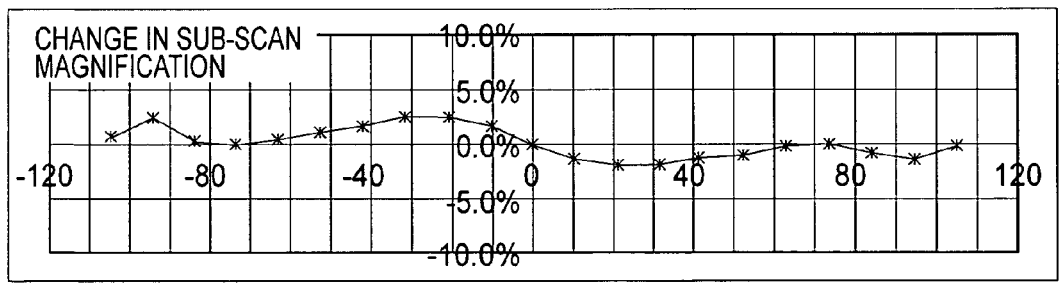

FIGS. 10A-10C illustrate geometrical aberration and uniformness of sub-scan magnification of the imaging optical element (imaging lens) with the image height. It is seen from these drawings that the aberrations are well corrected up to a practicable level, and that the change in the sub-scan magnification due to the image height is suppressed to 5% or less. Here, the change in sub-scan magnification with the image height should be 10% or less and, more preferably, 5% or less.

Figure 11:
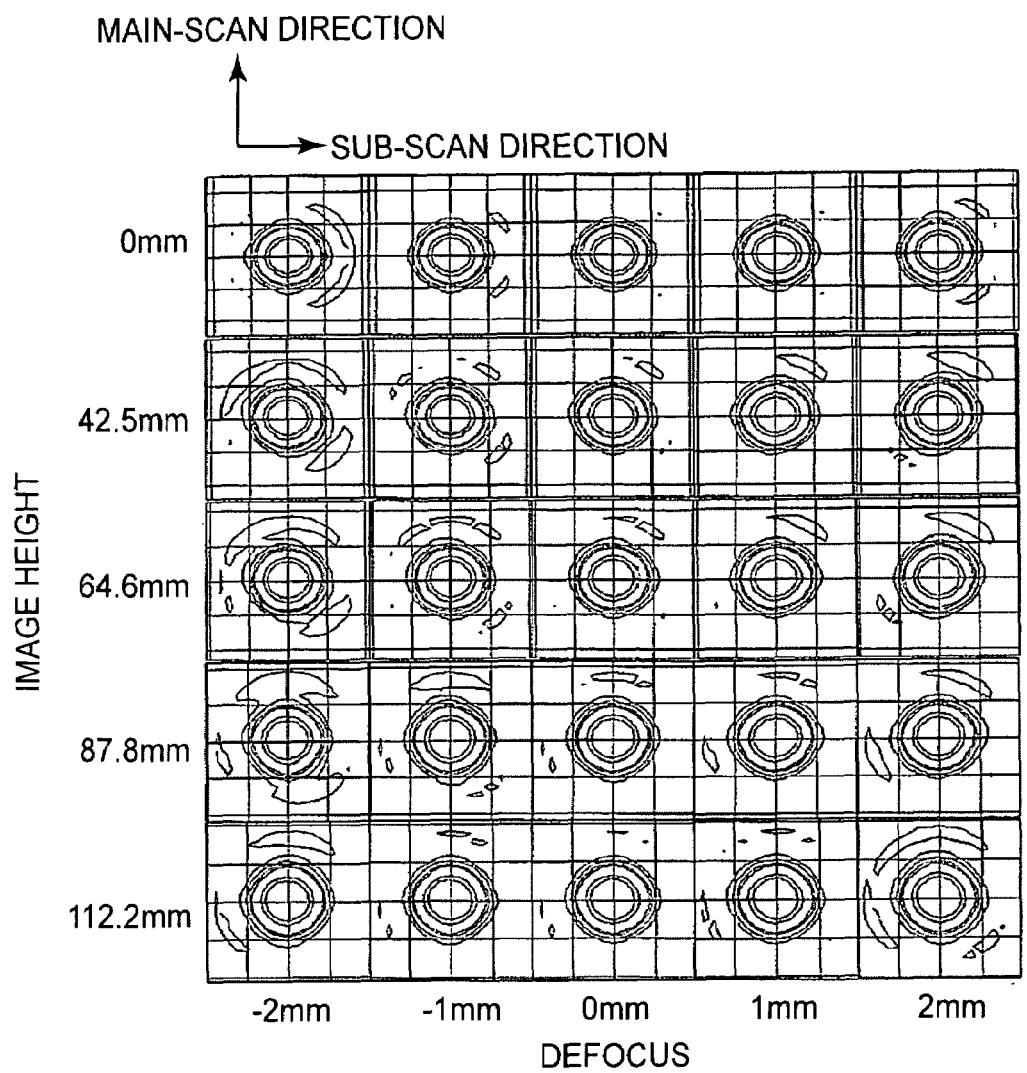
FIG. 11 is a schematic view for explaining the spot diameter in the third embodiment of the present invention.

FIG. 11 is a schematic view for explaining spot shapes upon the scan surface, in this embodiment. It is seen from the drawing that rotation of the light spot on the scan surface which may be produced when plural light beams from the light source means are obliquely incident on the deflecting surface 5a of the optical deflector 5, in the sub-scan sectional plane, is well corrected.

In accordance with this embodiment of the present invention, as described above, an imaging lens and an optical scanning system which is thinner and simpler in structure as compared with the first embodiment can be provided.

Furthermore, the optical scanning system of this embodiment uses a multi-beam laser as the light source means, and plural light beams from the light source means are obliquely incident on the deflecting surface of an optical deflector in the sub-scan sectional plane. When such optical scanning system is incorporated into a color image forming apparatus, a high-speed and high-quality color image forming apparatus is accomplished. Additionally, undesirable spot rotation on the scan surface can be well corrected by forming the light exit surface of the imaging lens with a non-arcuate shape (aspherical shape) in the sub-scan sectional plane.

[Embodiment of Image Forming Apparatus]

Figure 12:
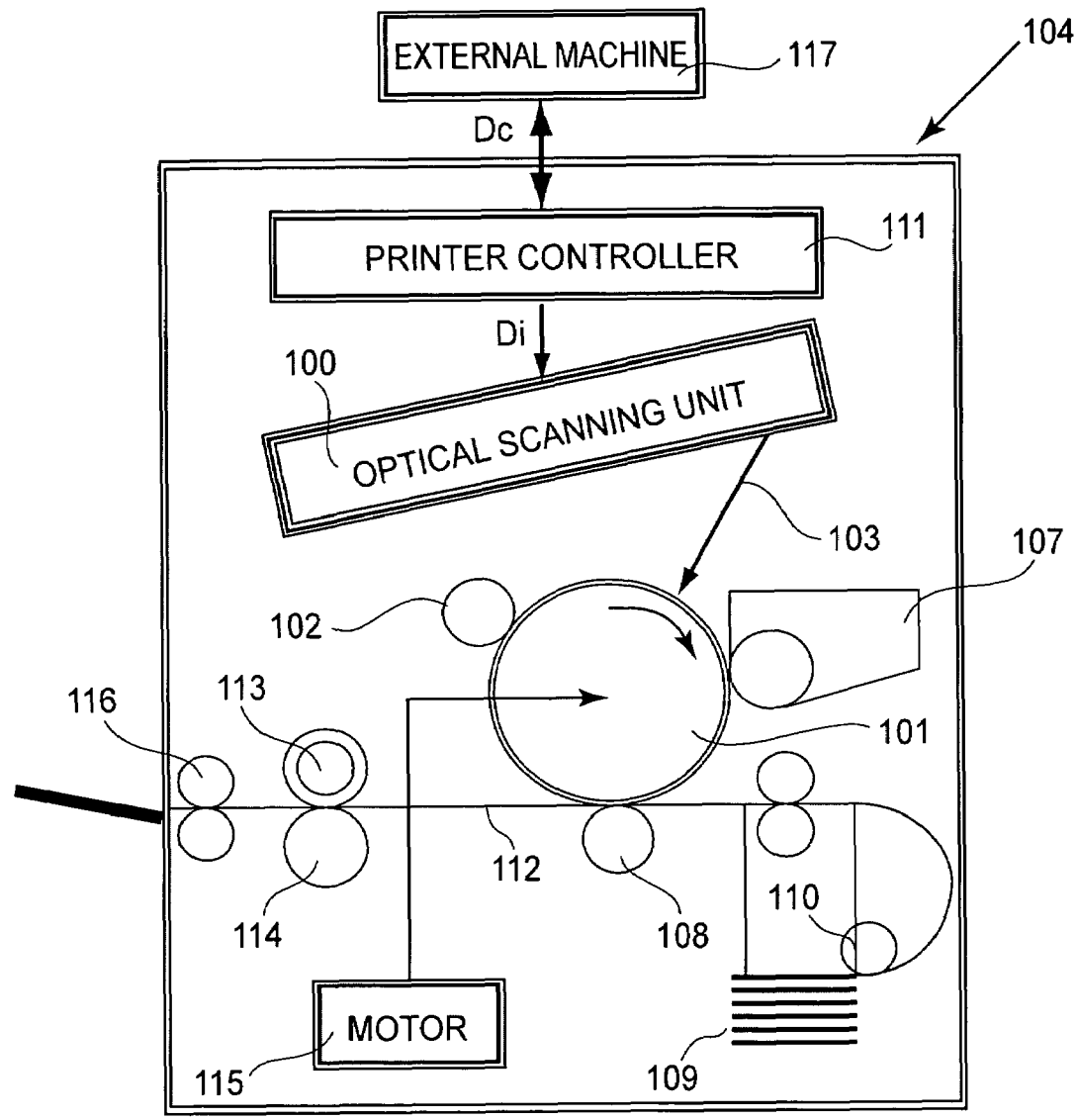
FIG. 12 is a schematic view, along a sub-scan sectional plane, of an image forming apparatus according to an embodiment of the present invention.

FIG. 12 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 12) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 12) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 12, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first to third embodiments of the present invention will be more effective when they are introduced into an image forming apparatus of a resolution 1200 dpi or higher.

[Embodiment of Color Image Forming Apparatus]

Figure 13:
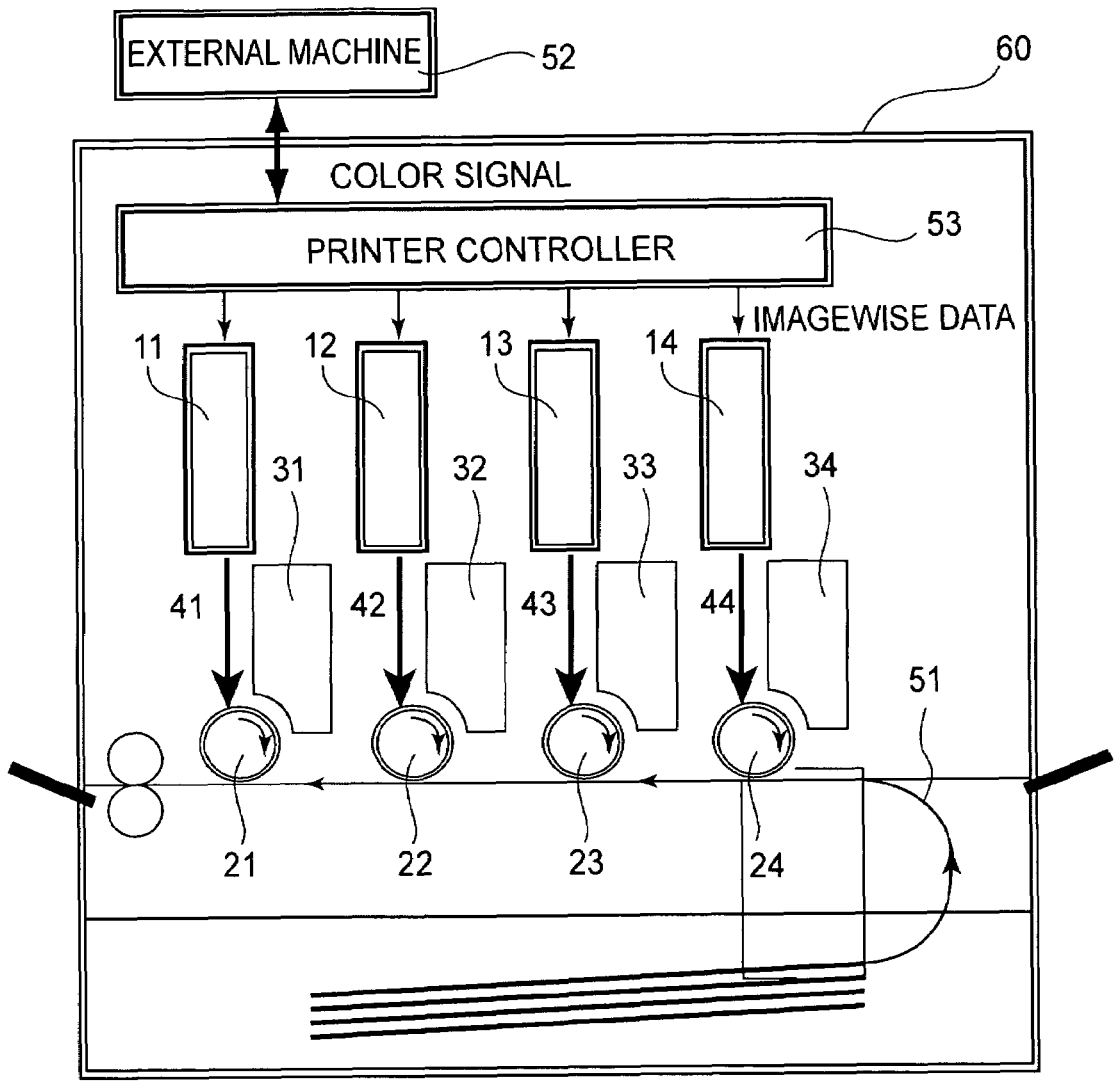
FIG. 13 is a schematic view of a main portion of a color image forming apparatus according to an embodiment of the present invention.

FIG. 13 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 13, denoted generally at 60 is a color image forming apparatus, and denoted at 11, 12, 13 and 14 are optical scanning systems having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

In FIG. 13, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 11, 12, 13 and 14, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning systems 11, 12, 13 and 14 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-352347 filed Dec. 6, 2005, for which is hereby incorporated by reference.

What is claimed is:

1. An optical scanning system, comprising:
light source means;
deflecting means for scanningly deflecting a light beam from said light source means; and
an imaging optical system for imaging, upon a scan surface to be scanned, the light beam deflected by said deflecting means,
wherein said imaging optical system consists of a single imaging optical element with a light exit surface having a convex shape with respect to a main-scan sectional plane, and wherein relations $$0.5 \leq \phi m/\phi p \leq 0.9$$

$$0 < dp/kp \leq 0.09$$

are satisfied, where $\phi p$ is a power of said imaging optical element at an optical axis with respect to a main-scan direction, $\phi m$ is a power of said imaging optical element at an outermost abaxial portion with respect to the main-scan direction, dp is a thickness of said imaging optical element at the optical axis, and kp is a k-$\theta$ coefficient of said imaging optical element at the optical axis.

2. An optical scanning system according to claim 1, wherein a relation $$1.1 \leq Vm/Vp \leq 1.5$$

is satisfied where Vp is a scan speed on the scan surface at the optical axis, and Vm is a scan speed at an outermost abaxial portion.

3. An optical scanning system according to claim 1, wherein said deflecting means scanningly deflects the light beam from said light source means at a constant angular speed, and wherein a relation $$0.1 \leq V \leq 0.5$$

is satisfied where V is a third-order distortion aberration coefficient of said single imaging optical element.

4. An optical scanning system according to claim 1, wherein a relation $$N \leq 1.6$$

is satisfied where N is a refractive index of said single imaging optical element.

5. An optical scanning system according to claim 1, wherein a relation $$30° \leq \theta max < 90°$$

is satisfied where $\theta max$ is a largest deflection angle of said deflecting means for scan inside an effective scan width on the scan surface.

6. An optical scanning system according to claim 1, wherein a relation $$|\beta s| \leq 3.0$$

is satisfied where $\beta s$ is an imaging magnification of said single imaging optical element at the optical axis with respect to the sub-scan sectional plane.

7. An optical scanning system according to claim 1, wherein the light beam incident on said single imaging optical element is a convergent light with respect to the main-scan sectional plane.

8. An optical scanning system according to claim 1, wherein said single imaging optical element has a light entrance surface having a non-arcuate shape with respect to the main-scan sectional plane.

9. An optical scanning system according to claim 1, wherein said single imaging optical element has a light entrance surface and a light exit surface having a convex shape with respect to the main-scan sectional plane.

10. An optical scanning system according to claim 1, wherein said single imaging optical element has a light entrance surface and a light exit surface, at least one of which has a power with respect to the sub-scan direction that is decreasing along the main-scan direction from the optical axis toward an abaxial portion.

11. An optical scanning system according to claim 1, wherein said single imaging optical element has a light entrance surface and a light exit surface, at least one of which has a non-arcuate shape with respect to the sub-scan sectional plane.

12. An optical scanning system according to claim 1, wherein an imaging magnification of said single imaging optical element at the optical axis with respect to the sub-scan sectional plane and an imaging magnification of the same at an outermost abaxial portion have a difference of 10% or less.

13. An optical scanning system according to claim 1, wherein an imaging magnification of said single imaging optical element at the optical axis with respect to the sub-scan sectional plane and an imaging magnification of the same at an outermost abaxial portion have a difference of 5% or less.

14. An optical scanning system according to claim 1, wherein, with respect to the sub-scan sectional plane, the light beam from said light source means is projected on said deflecting means in an oblique direction relative to a normal to the deflecting surface of said deflecting means.

15. An optical scanning system according to claim 1, wherein said light source means comprises a plurality of light emitting portions which are arranged to be modulated independently of each other.

16. An image forming apparatus, comprising:
an optical scanning system as recited in claim 1;
a photosensitive material disposed at a scan surface to be scanned;
a developing device for developing an electrostatic latent image formed on said photosensitive material through a light beam scanned by said optical scanning system, to produce a toner image;
a transferring device for transferring the developed toner image onto a transfer material; and
a fixing device for fixing the transferred toner image, on the transfer material.

17. An image forming apparatus, comprising:
an optical scanning system as recited in claim 1; and
a printer controller for converting code data supplied from an outside machine into an imagewise signal and for inputting the imagewise signal into said optical scanning system.

18. A color image forming apparatus, comprising:
an optical scanning system as recited in claim 1; and
a plurality of image bearing members each being disposed at a scan surface to be scanned by said optical scanning system, for forming images of different colors.

19. A color image forming apparatus according to claim 18, further comprising a printer controller for converting a color signal supplied from an outside machine into imagewise data of different colors and for inputting the imagewise data into corresponding optical scanning systems.

* * * * *

UNITED STATES PATENT AND TRADEMARK OFFICE
CERTIFICATE OF CORRECTION

PATENT NO. : 7,248,391 B2  Page 1 of 1
APPLICATION NO. : 11/606875
DATED : July 24, 2007
INVENTOR(S) : Jun Igarashi It is certified that error appears in the above-identified patent and that said Letters Patent is hereby corrected as shown below:

COLUMN 1:
    Line 10, "bean" should read -- beam --.

COLUMN 4:
    Line 61, "san" should read -- scan --.

COLUMN 7:
    Line 4, "a" should be deleted; and
    Line 31, "here" should be deleted.

COLUMN 8:
    Table 1, fourth entry, fourth column, "4.397E11" should read -- 4.397E-11 --.

COLUMN 11:
    Line 64, "Oi2" should read -- $O_{i2}$ --.

COLUMN 14:
    "R1," should read -- $R_1$, --.

COLUMN 16:
    Line 23, "the light exit" should read -- and the light exit --.

COLUMN 19:
    Line 58, "wise-data)" should read -- wise data) --.

Signed and Sealed this

Seventeenth Day of June, 2008

JON W. DUDAS
*Director of the United States Patent and Trademark Office*